US007600182B2

(12) United States Patent
Carr et al.

(10) Patent No.: US 7,600,182 B2
(45) Date of Patent: Oct. 6, 2009

(54) ELECTRONIC DATA CAPTURE AND VERIFICATION

(75) Inventors: Ian Carr, Nr. Evesham (GB); Darren Harding, Solihull (GB); Michael Sloan, Chinnor (GB)

(73) Assignee: Focus Business Solutions Limited, Warwickshire (GB)

( * ) Notice: Subject to any disclaimer, the term of this patent is extended or adjusted under 35 U.S.C. 154(b) by 401 days.

(21) Appl. No.: 10/516,898

(22) PCT Filed: May 20, 2003

(86) PCT No.: PCT/GB03/02180

§ 371 (c)(1),
(2), (4) Date: Aug. 15, 2005

(87) PCT Pub. No.: WO03/105022

PCT Pub. Date: Dec. 18, 2003

(65) Prior Publication Data

US 2006/0101051 A1 May 11, 2006

(30) Foreign Application Priority Data

Jun. 6, 2002 (GB) .................................. 0212934.4

(51) Int. Cl.
*G06F 17/00* (2006.01)
(52) U.S. Cl. ...................................... 715/222; 715/243
(58) Field of Classification Search .................. 715/222, 715/224, 221, 243
See application file for complete search history.

(56) References Cited

U.S. PATENT DOCUMENTS 4,912,669 A  3/1990  Iwamoto et al. ............. 364/900

(Continued)

FOREIGN PATENT DOCUMENTS

EP  0 678 817 A1  10/1995
WO  WO 95/07510  3/1995

OTHER PUBLICATIONS

Authorized Officer J. Woods, International Search Report for International Application No. PCT/GB03/02180 dated Jan. 5, 2004.

(Continued)

*Primary Examiner*—Laurie Ries
(74) *Attorney, Agent, or Firm*—Sunstein Kann Murphy & Timbers

(57) ABSTRACT

Apparatus for automatically building an electronic form for presentation to a user during a data capture process segregates the data capture intent behind the form from the presentation and execution of the form to a data capture user. In this way, the data capture process, including generation of the form and display of user input prompts, can be carried out on any computing platform independent of the system used to generate a data capture definition file that specifies the intent of the data capture requirements. The specification of data elements required during data capture, each having a type specification and a logical relationship relative to other data elements in a hierarchical structure are defined in a data capture definition file in a predetermined format. A data capture process executes the data capture definition file and automatically generates a plurality of visual displays for presentation to a user, each input screen comprising a plurality of user input areas corresponding to the data elements and physically positioned on the screen in a manner corresponding to the defined logical hierarchical structure.

34 Claims, 33 Drawing Sheets

U.S. PATENT DOCUMENTS

| | | | | |
|---|---|---|---|---|
| 5,704,029 | A | 12/1997 | Wright, Jr. | 395/149 |
| 5,774,887 | A * | 6/1998 | Wolff et al. | 707/1 |
| 5,796,401 | A | 8/1998 | Winer | 345/619 |
| 5,907,852 | A * | 5/1999 | Yamada | 715/222 |
| 6,239,802 | B1 | 5/2001 | Lahey et al. | 715/810 |
| 6,993,715 | B2 * | 1/2006 | Deen et al. | 715/239 |
| 7,043,732 | B2 * | 5/2006 | Mandal et al. | 719/310 |
| 7,346,840 | B1 * | 3/2008 | Ravishankar et al. | 715/234 |
| 2002/0049749 | A1 * | 4/2002 | Helgeson et al. | 707/3 |
| 2003/0204436 | A1 * | 10/2003 | Flender et al. | 705/10 |
| 2005/0097008 | A1 * | 5/2005 | Ehring et al. | 705/26 |

OTHER PUBLICATIONS

Search Report for UK Application No. GB0212934.4 dated Dec. 3, 2002.

Examination Report for UK Application No. GB0212934.4 dated Mar. 22, 2005.

Eric Potter Clarkson LLP, response dated Jul. 8, 2005 to the examination report of Mar. 22, 2005 for UK Application No. GB0212934.4.

Examination report for EP Application No. 03732650.1 dated Jun. 13, 2005.

Raymond J. Charig, response dated Dec. 20, 2005 to examination report of Jun. 13, 2005 for EP Application No. 03732650.1.

Invitation for EP Application No. 03732650.1 dated Apr. 20, 2006.

Further examination report for EP Application No. 03732650.1 dated May 12, 2006.

Raymond J. Charig, response dated Nov. 8, 2006 to examination report of May 12, 2006 for EP Application No. 03732650.1.

Summons to oral proceedings for EP Application No. 03732650.1 dated Mar. 23, 2007.

Raymond J. Charig, response dated May 24, 2007 to summons of Mar. 23, 2007 for EP Application No. 03732650.1.

Brief communication for EP Application No. 03732650.1 dated Jun. 18, 2007.

Raymond J. Charig, response dated Jun. 20, 2007 to brief communication of Jun. 18, 2007 for EP Application No. 03732650.1.

Formalities Officer Doreen Golze, decision to refuse EP Application No. 03732650.1 dated Jul. 12, 2007.

Raymond J. Charig, grounds for appeal dated Nov. 9, 2007 in response to decision of Jul. 12, 2007 for EP Application No. 03732650.1.

Carlson et al. "Forms Interfaces and Their View Supportability Properties" Computer Software and Applications Conference, 1990. COMPSAC 90 Proceedings, Fourteenth Annual International Chicago, IL, USA 31 Oct. 31-Nov. 2, 1990, Los Alamitos, CA, USA, IEEE Computer Soc., US, Oct. 31, 1990, pp. 448-452, XP010019753A, ISBN: 0-8186-2054-4.

Hanson, Mike Hanson. "Saving Time with Global Templates" The Clarion Online Archives, Clarion Magazine, XP-002264045 [online], [retrieved on Apr. 12, 2003]. Retrieved from the Internet <URL: http://tinyurl.com/xq0a>, p. 1.

Oracle "Getting Started with Oracle Change Management Pack" Oracle, XP-002264044 [online], [retrieved on Jun. 2001]. Retrieved from the Internet <URL: http://download-uk.oracle.com/docs/pdf/A88717_01.pdf>>, pp. 1.22-3.23.

* cited by examiner

ELECTRONIC DATA CAPTURE AND VERIFICATION

CROSS-REFERENCE TO RELATED APPLICATIONS

This application is a 371 of PCT/GB03/02180 filed on May 20, 2003, which claims priority from United Kingdom patent application number 0212934.4 filed on Jun. 6, 2002, both of which are hereby incorporated herein by reference in their entireties.

FIELD OF THE INVENTION

The present invention relates to methods and apparatus for enabling electronic capture of data input by a user and data exchange between systems. In particular, the invention relates to methods and apparatus for the automatic generation and presentation of forms for display on a computer monitor, which forms guide and prompt a user to enter data into appropriate fields in the displayed form. The invention further relates to methods and apparatus for automatically testing the data being input for compliance with predetermined validation criteria, and rule-based determination of subsequent action (such as determination of the nature of a subsequent screen display) based on the data input. The invention further relates to methods and apparatus that can be used in data exchange between systems whereby validation criteria and rule based actions can be applied during data exchange.

BACKGROUND OF THE INVENTION

Many organisations throughout industry and commerce, such as banking, insurance, finance, healthcare etc, have a common requirement to receive and process complex data relating to individual customers that they serve. For example, insurance organisations need to capture large quantities of personal information from individuals, which information include names, addresses, ages, personal circumstances, lifestyle details, health details, insurance cover requirements, and so on. Conventionally, the most convenient way to do this has been by the use of forms, which can be presented in hard copy, or preferably presented on a computer monitor, enabling direct capture of the entered data onto computer storage media.

Many of the data values entered by a user actually determine the type and range of further questions that must be asked of the individual, and thus it is desirable that the computer system verify the accuracy of the data, in real time, during data entry, and then use a rule-based system to determine further forms for presentation to the user based on the prior data entry.

While this type of form-based data entry and capture is a very convenient and accurate method for the user, the initial set up costs for providing suitable, well-presented forms with underlying data capture logic that exactly match each organisation's specific data capture requirements is a complex task that requires advanced programming skills.

Each form must be specifically customised in terms of the presentation and content of questions or prompts to be displayed to the user, the format of data to be received, the validation rules for checking the data as it is being entered, and rule-based actions executed in real-time which determine outcomes based on the data values received, such as determining further data capture requirements based on the received data.

The data capture logic must not only determine the information content and layout of the forms presented to the user, the data validation functions and the rules for use during form execution, but also must define how the data should then be exported to (eg. mapped into) the organisation's database, or exchanged with other databases. Clearly, the persons who are best placed to comprehend and define the organisation's data capture requirements (ie. the "business experts" who have detailed knowledge of the business requirements behind the data) are not likely to have the advanced programming skills necessary to implement the electronic data capture functions.

There are a wide variety of prior art computer applications which enable a person (acting as a form architect) to define an electronic data capture or exchange.

Many of these prior art systems provide WYSIWYG-type form building or data exchange capabilities intended for backoffice, client/server or traditional desktop environments, and may include facilities to define the function—ie. the data validation and rule based actions.

Some prior art applications allow a data model to be defined, enabling the data capture to be contained, transported and exchanged according to a predetermined standard.

Some prior art applications provide a means of central control where multiple users have assigned roles to manage the application usage.

Additionally, there are tools and utilities available, which can be used to define an electronic data capture or exchange, but these do not provide interfaces to abstract the form architecture from the underlying technology or expertise required in order to utilise the data capture or exchange.

Thus, there are a significant number of problems with the prior art approaches.

i) The WYSIWYG-based applications are prescriptive in their approach to form design. As shown in FIG. 7, an architect 8 defines data capture by use of a visual form 1 with positional (x-y) co-ordinates, upon which the architect graphically places the data items to be captured, ie. textboxes, radio buttons, drop down lists, menus etc.

The problem with this approach is that the architect is graphically designing a form 1, according to a specific target of execution 22 (ie. a single data capture requirement, rather than an approach of intent where the architect 8 merely specifies what data is to be captured or exchanged (ie. the intent).

ii) In the prior art, the target execution of a data capture and/or exchange built using a WYSIWYG-based application is restricted to the specific technology or platform 22 in which the application operates. As illustrated in FIGS. 5 and 6, if a data capture/exchange is required for execution across multiple technologies/platforms, in the prior art, the architect is required to repeatedly define the form 1, function 2 and data model 3 container, using a different application for each single specific execution purpose 22 technology platform required. As shown in FIG. 5, each implementation of a form requires a separate build process for each different technology/platform, even though there might only be one set of data capture requirements, rules/function and data model.

In this regard, XML tools and utilities can be used to create a single XML document to achieve this purpose, but this requires that the architect possesses the necessary XML technical skills and understanding of the XML dialect and schema employed. The architect 8 is not provided with an environment with which they can specify their requirements of the data capture and/or exchange.

iii) Using WYSIWYG-based applications, a defined data capture executed as a form cannot also be used as part of an automated data exchange mechanism between systems. Some of these applications can be used to create data exchange mechanisms, or components thereof, but this is a separate function, and an existing defined data capture plays no part in the construction or use of the data exchange, requiring the data definition 21, function 2 and data model 3 to be redefined.

In this regard, XML tools and utilities can be used to create a single XML document to achieve this purpose, but this requires the architect to possess the necessary XML technical skills and understanding of the XML dialect and schema employed. The architect 8 is not provided with an environment with which they can specify the requirements of the data capture and/or exchange.

iv) None of the prior art described above provide the ability for the architect to construct a form according to an XML form definition standard, and validate that form against it, without requiring the appropriate XML technical skills and knowledge of the XML dialect employed.

v) None of the prior art described above provide the ability to automate form construction based on an XML form definition standard, or parts thereof. The architect has to manually construct the form. Some applications will automatically generate a form based on a database table definition or similar, but this does not constitute a form definition standard, and the automation uses the entire table or model, rather than selected part(s).

vi) None of the prior art described above, provide the ability for the architect to define the data model container for the form or to set conditions against which the form data is bound to the data model, without requiring appropriate XML technical skills and knowledge of the XML schema employed.

vii) None of the prior art described above supports the specific combination of creation, use, re-use and propagation of entire or part forms as templates, by multiple users with assigned roles and rights, utilising locking at form level to prevent conflicts.

SUMMARY OF THE INVENTION

Embodiments of the present invention may provide a form design tool that automatically generates an appropriate form layout for presentation to a user during a data capture process, based on an architect's specification of data items, validation criteria and rule-based execution criteria.

Embodiments of the present invention may also provide a software application that enables an architect to define his or her data capture requirements, the criteria for validation of the data and the rule-based actions governing outcomes based on the data input, to create a data capture definition file that can subsequently be used by a presentation/execution program to automatically generate a data capture form layout for presentation to a user, and execute data capture therefrom, in which the data capture definition file is platform independent.

Throughout the present specification, the expression "form" is intended to cover one or more of a series of computer-generated displays presented to a user, containing suitably presented data input areas such as text fields, check boxes, drop down menus, selection menus and the like. The expression "architect" is intended to refer to the person designing a form or, in the context of the present invention, providing the data capture requirements that will result in automated building of the form. The expression "user" is intended to refer to the person entering data during a data capture session using the forms automatically generated on screen.

In accordance with embodiments of the present invention, the process of defining the "intent" of the forms—ie. the process of specifying the data to be captured, by a business expert, can be divorced from the definition of the actual form layout. Also, the form layout can be effected independently and automatically when the specification of the data to be captured has been provided in a suitable hierarchical manner.

A software application program may be provided to enable an organisation to centrally define, manage and maintain their intent for electronic data capture requirements, which is effected by means of documents conforming to predetermined standards that can be deployed in multiple environments, where they are executed as forms.

According to one aspect, the present invention provides apparatus for automatically building an electronic form for presentation to a user during a data capture process, comprising:

means for receiving as input a specification of data elements required during data capture, each data element having a type specification, and a logical relationship relative to other data elements in a hierarchical structure;

means for generating, from said input, a data capture definition file providing said specification of data elements and said hierarchical structure in a predetermined format; and means for receiving said data capture definition file and automatically generating a plurality of visual displays for presentation to a user during execution of a data capture process, each input screen comprising a plurality of user input areas corresponding to the data elements and physically positioned on the screen in a manner corresponding to the defined logical hierarchical structure.

According to another aspect, the present invention provides apparatus for generating a data capture definition file for defining data elements required from a user during a data capture process, comprising:

means for receiving as input a specification of data elements required during data capture, each data element having a type specification, and a logical relationship relative to other data elements in a hierarchical structure, said type specifications and said hierarchical structure being usable for automatically determining a physical layout of visual displays for presentation to a user during a subsequent data capture process;

means for associating, with said data elements, a set of data validation requirements for validating data captured in respect of each of the data elements;

means for associating, with said data elements, a set of rules for execution during a subsequent data capture process, for further enabling automatic determination of a physical layout of the visual displays to be presented to a user during said subsequent data capture process based on values of data captured during said data capture process;

means for generating said data capture definition file providing said specification of data elements, said hierarchical structure, said data validation requirements and said set of rules in a predetermined format for subsequent execution by a data capture process.

According to another aspect, the present invention provides an apparatus for generating a generating an electronic form for presentation to a user during a data capture process, the apparatus comprising:

means for receiving as input a data capture definition file in a predetermined format providing a specification of data elements required during data capture, each data element having a type specification and a logical relationship relative to other data elements in a hierarchical structure;

means for automatically generating a plurality of visual displays for presentation to the user, each visual display including a plurality of user input areas and user prompts relating thereto corresponding to the data elements, each being physically positioned on the displays in a manner corresponding to the defined logical hierarchical structure.

According to still further aspect, the present invention provides a method for building an electronic form, a method of generating a data capture definition file, and a method of generating an electronic form for presentation to a user as carried out by the apparatus defined above.

BRIEF DESCRIPTION OF THE DRAWINGS

Embodiments of the present invention will now be described by way of example and with reference to the accompanying drawings in which:

FIG. 38 is a screenshot of a user input screen for providing as first input a number of applicants;

FIG. 40 is a screenshot of the user input screen of FIG. 39, but presented as an on-line web page;

FIG. 43 is a screenshot corresponding to FIG. 41, but presented as an on-line web page;

DETAILED DESCRIPTION OF A PREFERRED EMBODIMENT

Figure 1:
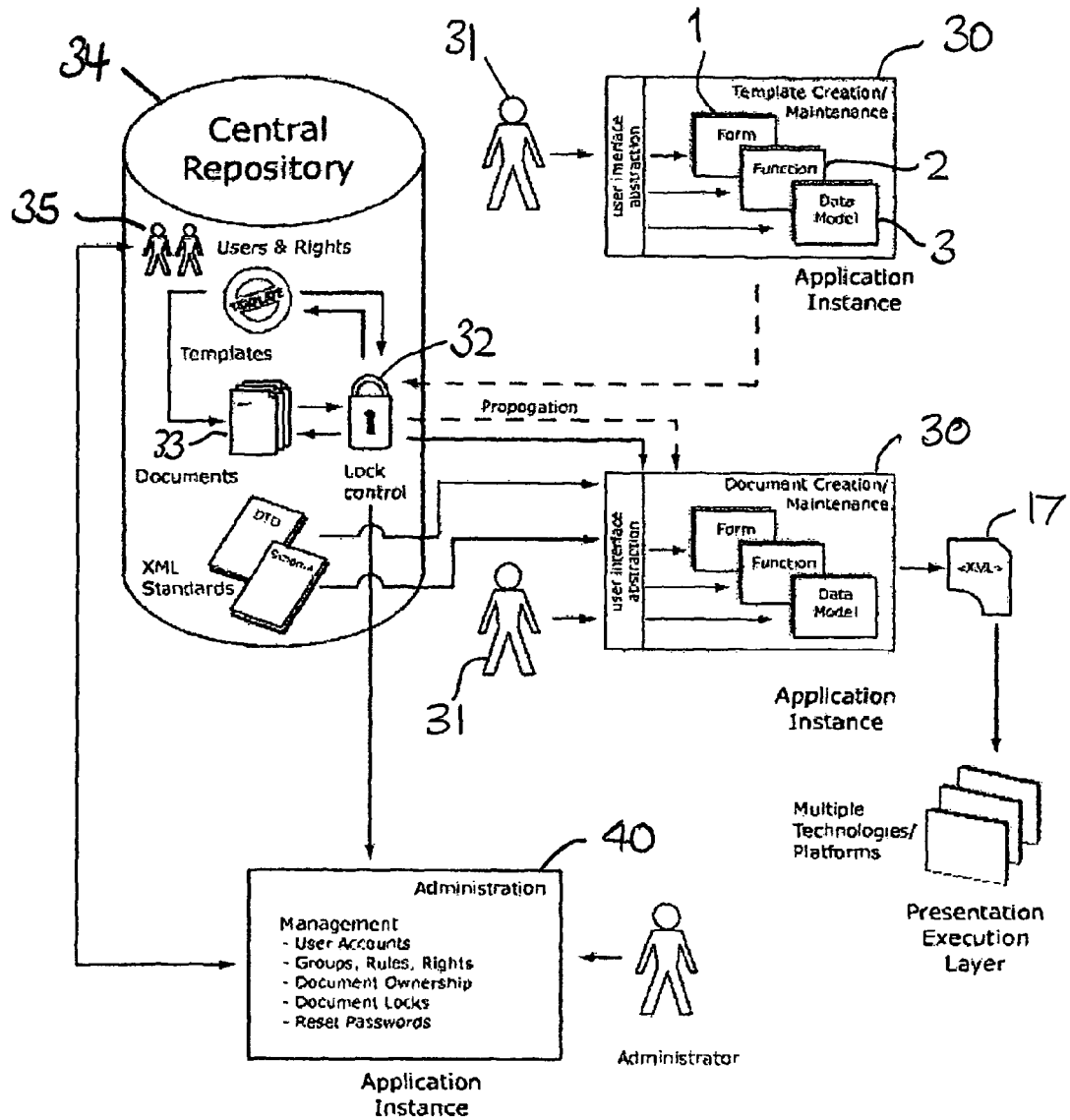
FIG. 1 shows a schematic diagram at system level illustrating the environment of a form builder according to the present invention.
Figure 2:
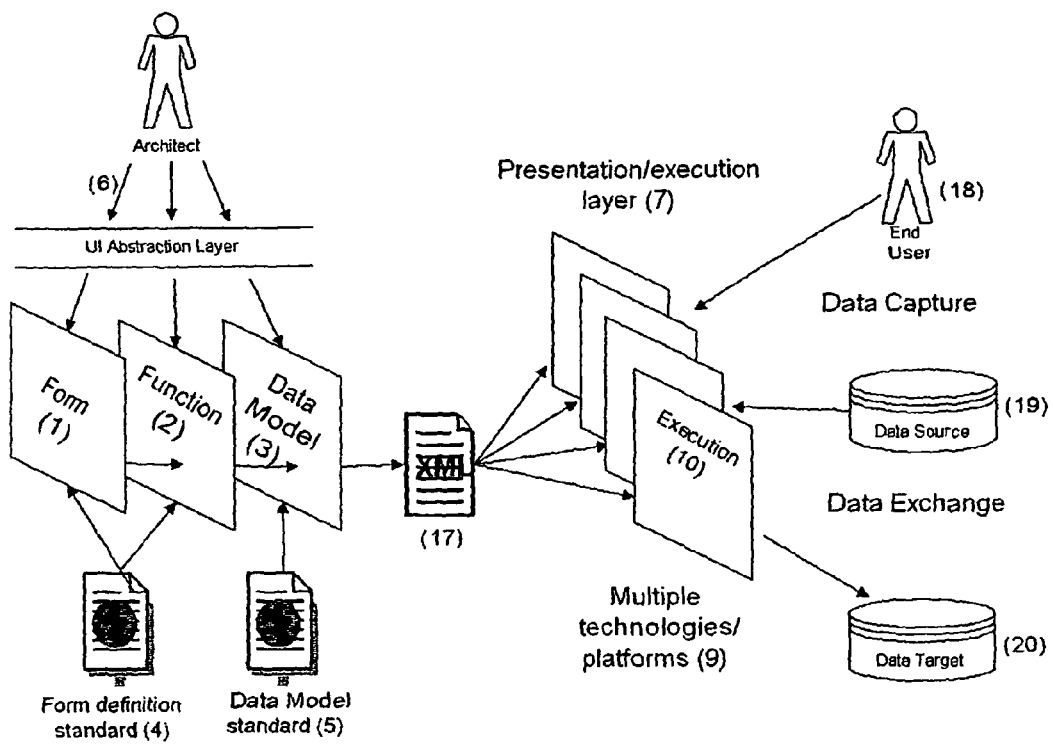
FIG. 2 shows a more detailed schematic diagram of the form builder and execution modules according to the present invention.

With reference to FIGS. 1 and 2, the invention provides a software application 30 which enables an organisation to centrally define, manage and maintain their electronic data capture requirements in predetermined data capture definition file formats, which are preferably effected as self-contained XML documents 17, although other standard existing or future document formats could also be used.

Each data capture definition file 17 consists of a form definition 1, a function definition 2 and a data model definition 3, that can be deployed in multiple environments, where they are executed as forms and/or as part of a data exchange. In particular, the data capture definition file 17 comprises a specification of data elements that are required for data capture, each data element having a type specification that specifies the type of data to be collected, and an indication of its logical hierarchical position relative to other data elements in a hierarchical structure.

The application 30 can be fully operated by ordinary persons 31, acting as form architects having no particular technical knowledge or understanding of programming, including XML and scripting technologies involved. The application 30 can be installed and maintained with minimal or no technical support.

Furthermore, the application 30 enables the data capture to be defined in a standard manner, using a form definition standard 4. The function 2 is defined as data validation and rules assigned to events, and the data itself to be contained within a data model 3 for storage, transport and exchange between systems 18, 19, 20 that offer interfaces adhering to the same model.

The application 30 supports multiple architects 31 with assigned roles and rights, and utilises locking 32 at document level to prevent conflicts. To enable joint construction and re-use, templates can be created, used and propagated within other documents—as part or whole.

The application 30 preferably uses a database repository 34 to store the documents 17, 33 that collectively form an organisation's data capture requirements.

By means of user accounts 35, passwords, groups, roles and rights (assigned to individual documents 33), the application 30 preferably enforces security to support multiple architects and provide control over rights.

Preferably, an administrator account 40 exists to administer the security, with the ability to create, delete or edit user accounts 35, groups or roles, reset passwords, change document ownership or unlock a locked document.

To prevent document change conflicts, the application 30 preferably employs document level locking. In order to edit a document, the architect 8, 31 must 'lock' the document 17, 33 for editing. Whilst 'locked', only that architect is able to make and save changes. Other architects can read the document whilst it is locked for editing.

Preferably, the document creator 8, 31 is the document owner. Only the document owner can delete the document and change the rights that other users have over the document.

In order to keep track of document history and releases, preferably the application 30 supports versioning and revision. When a document 17, 33 is versioned or revised, a read-only copy is made at that point and the original document major or minor version number is increased respectively.

Additionally, the application 30 preferably provides the following facilities at document level, to aid management of an organisations data capture requirements:
1. Create a new document
2. Create by copy—a document can be copied as a new document
3. Rename a document
4. Import/export or release a document
5. Preview a document—test deployment of a document in a data capture operation The process of defining a data capture/exchange consists of building the three main components contained within the data capture definition file 17, preferably an XML document, for deployment by an end user 18 via a presentation/execution layer 7.

The data capture definition file comprises a form definition 1 which complies with a form definition standard 4. The architect 8 specifies his or her intent 6 for the contents and hierarchical structure of the form. The contents and structure comprise a definition of the data items to be collected in execution of the form, each data item having a data type, and a relative position in a hierarchical structure comprising sections and sub-sections. The form definition does not define the layout of the data as it will be presented on a user input screen for data capture, since this aspect will be interpreted and executed 10 at the presentation layer 7. A significant feature of this presentation/execution layer 7 is that, because it operates upon a data capture definition file 17, 33 that conforms to a predetermined standard, it can be operated on multiple technologies/platforms 9.

The function definition 2 in the data capture definition file 17, 33 includes the data validation, rules and events that define the function of the form during its execution either at the presentation/execution layer 7, or as part of a data exchange 19, 20.

The data model container definition 3 indicates how the data captured is to be formatted in the output resulting from data capture. This adheres to a data model standard 5 used for storage, transport or exchange between systems that offer interfaces adhering to the same model.

Figure 3:
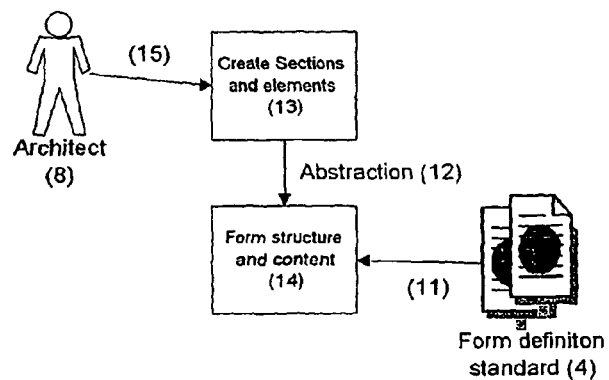
FIG. 3 shows a schematic diagram of the data capture definition file building operation.

With reference to FIG. 3, the application 30 enables definition 15 of the form structure and content 14 of the data capture/exchange requirements according to the form definition standard 4. The definition includes a plurality 13 of data elements in sections and sub-sections defining a hierarchy to the data elements. It is this hierarchy that will be used, in part, by the presentation/execution layer 7 to determine the final layout of the forms presented to the data capture end user 18.

The architect 8 is abstracted 12 from requiring any knowledge or understanding of the form definition standard 4 by means of an interface that enforces conformity through a validation process 11, and only presents the sections and elements contained therein for selection. When adding new sections or elements 13, the architect 8 can specify the type of section, ie. a column section, and the data element type. A non-exhaustive list of examples of data types is: text, number, currency, date, list, combo-box, caption, option, checkbox, yes/no, radio button, popup, or picture.

Additionally, data elements can have characteristics that can be defined. A non-exhaustive list of possible data element characteristics is: precision, default value, prefix/suffix, width, height, currency, read only or leading zeros.

All of these types and characteristics are preferably defined by the form definition standard 4.

Figure 4:
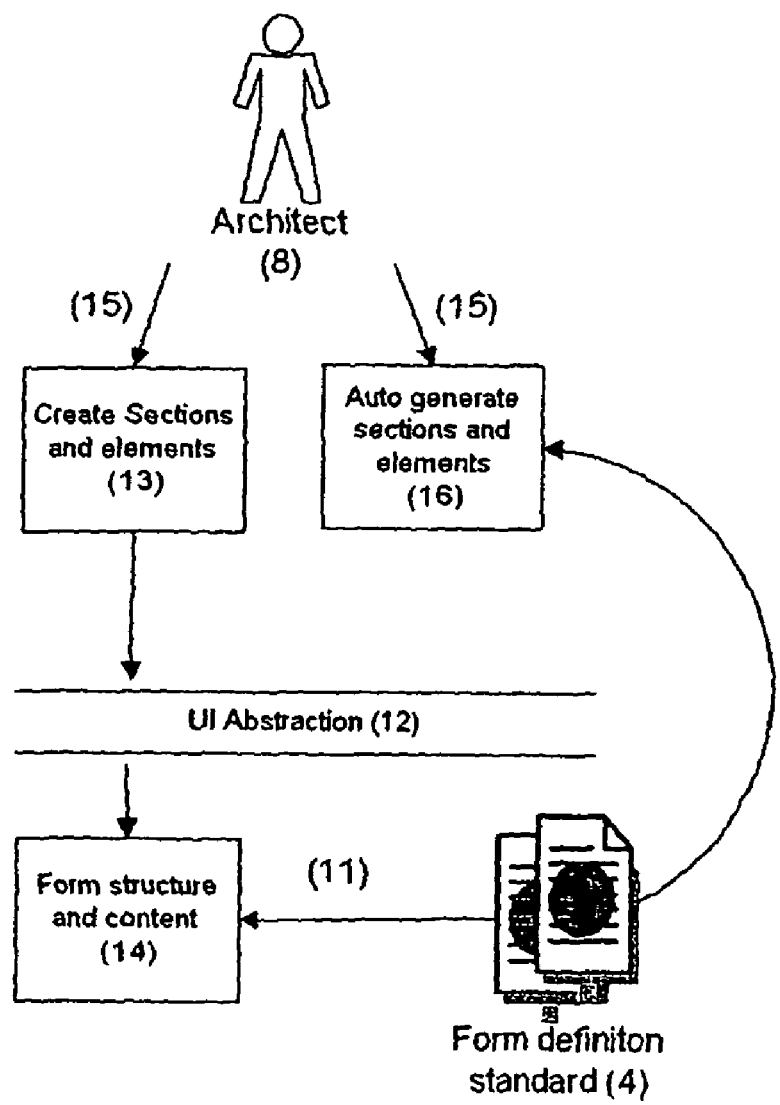
FIG. 4 shows a schematic diagram of the data capture definition file building operation including automatic section and element generation.
Figure 5:
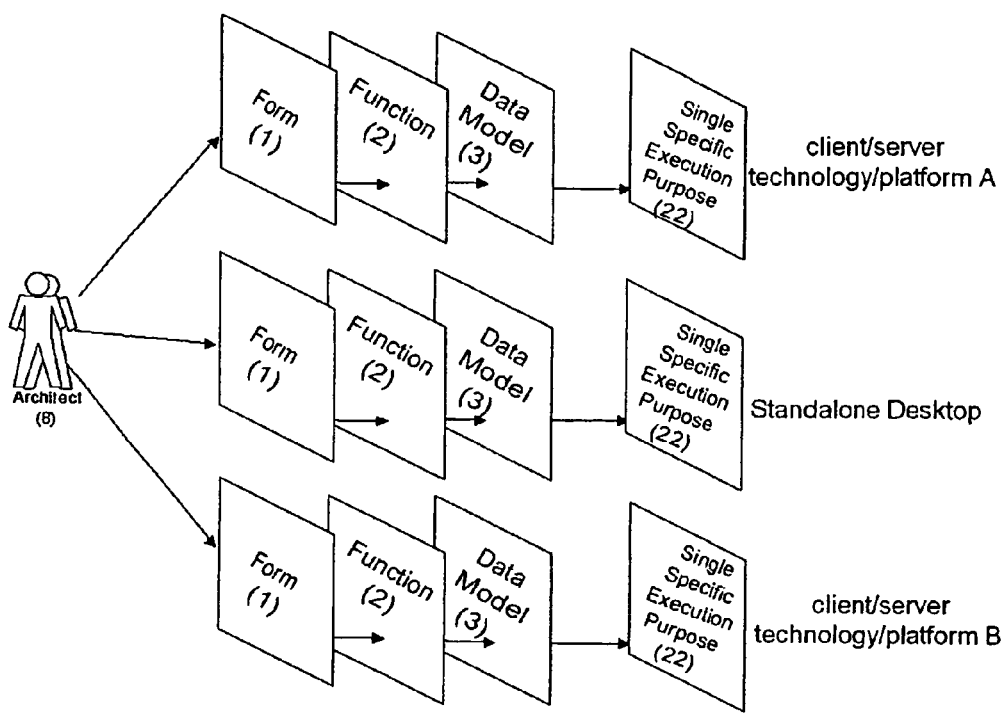
FIG. 5 is a schematic diagram of a prior art platform dependent form building operation.
Figure 6:
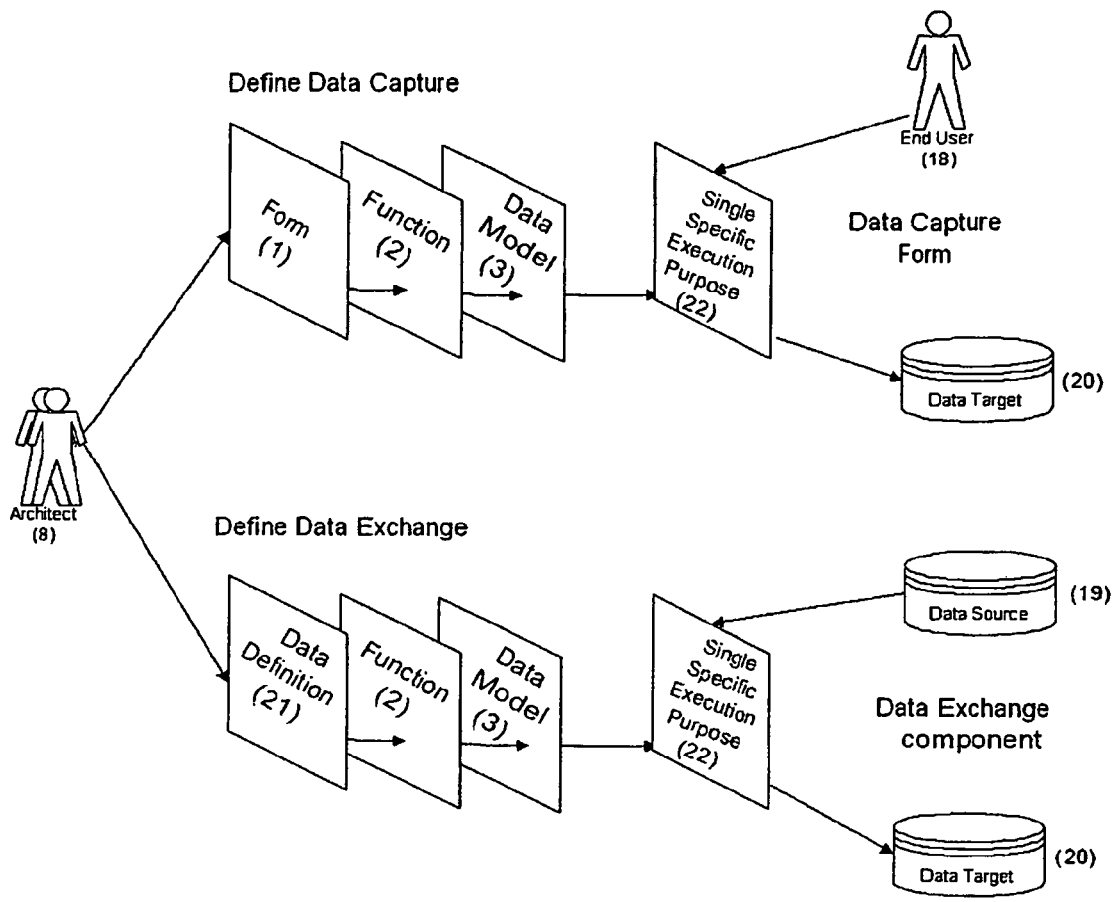
FIG. 6 is a schematic diagram illustrating prior art data capture and data exchange operations.
Figure 7:
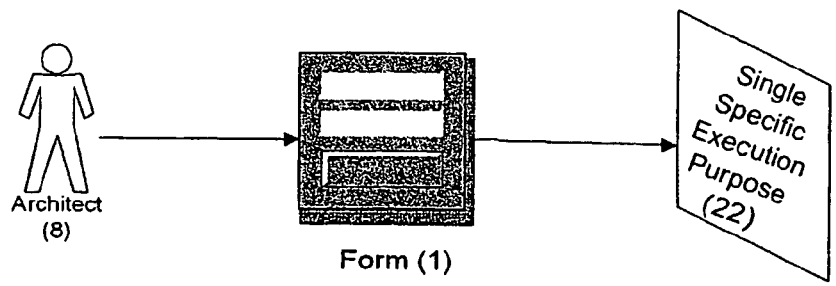
FIG. 7 is a schematic diagram of a prior art graphical form design process.

With reference to FIG. 4, the application 30 preferably enables automated generation 16 of the data capture definition file 17, 33, or a part thereof, based on the form definition standard 4.

In this manner, the architect 8 is able to specify 15 the intent 6 for the data capture requirements according to the form definition standard 4. The architect 8 does not specify how the form is presented, since this interpreted from the data capture definition file 17 during execution 10 at the presentation layer 7, which can be across multiple technologies/platforms 9.

During execution 10 of the form, the data validation, rules and events define the function of the form—the operation.

The application 30 preferably enables definition of rules and their respective rule functions 2 by providing a rule builder interface that enables an architect 8 to create complex rule actions and conditions, and assign them to the events (eg. when the value of a data element is provided), without requiring any knowledge of the underlying script that is generated.

Basic data validation functions can be assigned to the individual elements in the same way the element type and characteristics are defined, including such items as mandatory, max length, minimum or maximum value (as determined by the form definition standard 4).

The application 30 preferably enables the storage, transport or exchange of the data capture, by enabling the architect to bind the form elements to a defined XML data model. During the executable lifecycle of the form, the data captured is stored within the data model 3, where rule actions can be effected upon it, and data transport or exchange can take place to/from external data sources 19, 20 also adhering to the same data model. Specification of the data model construct, is stored within the XML document as bindings.

The application abstracts this construction, by providing an interface, which enables form elements being bound to the entities and attributes within the data model, but does not require the architect to have any knowledge or understanding of the underlying XML and schema employed. Additionally, by means of a condition builder interface, the application enables the architect to specify logical conditions that must evaluate true during form execution, in order for the specified elements of the form to be bound to the data model.

For data import, Xpath or XSL queries are required that specify the data retrieval mechanism from the data source. To aid the architect in the construct and testing of these queries, the application 30 preferably provides a Query Builder tool.

The application 30 preferably enables joint construction and re-use of a data capture (or part thereof) by multiple architects, by the use of templates.

An existing document 17, 33 of part thereof, can be selected to form a new template, or if desired, a template can be created and built from an empty, new template. A template is preferably owned and modified by the template creator. A template can preferably be used in the construction of a document, to form part of that document, or the whole. A template can preferably be used in the construction of another template, and there can be several layers of nested templates. When a template is used in another document or template, it is known as a template copy, which is linked to the original.

When a template is modified, all documents or other templates that use the modified template will preferably be automatically flagged for change. The next time these documents or other templates are accessed, the architect 8 is notified of the changes made to the originating template, to which they can accept or reject those changes to be propagated to the template copy within the receiving document or template currently being accessed.

A template copy in another document or template can be selected to 'break link' with the original template. When selected to 'break link' the template copy is no longer identified as such and any changes made to the original template are no longer flagged for propagation in that document or template.

To aid control and management of templates, an impact analysis facility may be provided on templates, which facility reports the names of all the documents and other templates that have copies of that template.

The application enables the data capture requirements as self-contained XML documents, to be transferred between separate installations of the application, using an import and export facility.

During import the document is validated against the form definition standard 4 and data model standard 5, and any identified errors are listed for the architect to correct, using the application 30.

Upon selecting to export a document, it is first validated against the form definition standard 4 and data model standard 5, to ensure it conforms. If it passes validation, the data capture requirements for the specified document containing the form, function and data model are extracted from the central database repository 34 as a self-contained and portable XML document 17, 33, which can be imported at another installation of the application, or the same installation as a duplicate.

When a data capture definition is completed and ready for deployment, it can be released as a self-containing XML data capture definition file (document), consisting of the form, function and data model. The release process first validates the document against the form definition and data model standards, to ensure it conforms. If it passes validation, the form, function and data model for the data capture, are extracted from the central repository as a portable self-contained XML document.

As shown in FIG. 2, the self-contained XML document 17 can be deployed for execution 10 at the presentation layer 7 for an end-user 18 and/or as part of a data exchange 19, 20 across multiple technologies/platforms/environments 9.

A self contained XML document 17 released from the application can be executed at the presentation layer 7 for display to a data capture user, for data capture 18, using any suitable host runtime element. There are a number of these available, operating in different technologies/environments, such as standalone desktop computer, and client/server solutions in different technologies (eg. server side Java, client side browser, or server side Microsoft, client-side browser). The client-side browser capability of the runtime element does not require any components to be downloaded for data capture—it is purely html and script sent directly from the server. This enables deployment of the presentation/execution layer 7 across multiple devices and platforms, such as internet kiosk, hand-held device, etc. Thus, the defined data capture requirements encapsulated as a self-contained XML document 17 can be executed 10 across multiple technologies/platforms 9.

The runtime presentation/execution layer 7 interprets the data capture definition file 17 for presentation to the end-user 18, at which time the actual display characteristics such as form layout and position of all data elements are determined according to the hierarchical structure defined in the data capture definition file. The presentation/execution layer also executes the function defined in the data capture definition file, which defines the operation and interaction with the end-user 18.

As data is captured from the form 1 and function 2, it is stored in the data model 3, which can be exchanged 19, 20 with other systems, which offer interfaces that adhere to the same data model definition.

In the same manner that the runtime presentation/execution layer executes 10 a self-contained XML document 17, it can also execute 10 as part of a data exchange 19, 20. This can occur in place of, or in addition to the presentation layer 17.

The runtime host described above provides interfaces that enable the data capture stored in the data model 3 to be transferred to an external file system or message queue. In similar fashion, the data model 3 can be pre-populated from an external file system or message queue.

In this manner, the XML document can be executed as part of a data exchange whereby data can be imported from an external data source and/or the data capture, and exported to another external data source.

An exemplary sequence of generation of a data capture definition file suitable for generation of a form during execution of the data capture process will now be illustrated.

Figure 8:
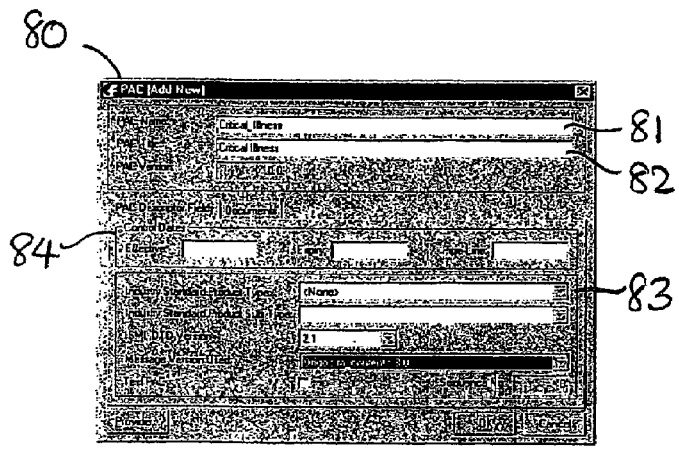
FIG. 8 is a screenshot of a first stage input box in a new form definition process.

As shown in FIG. 8, when a new data capture definition file (referred to in the illustrations as a PAC—"Product Application Component), is created by an architect 8, they first specify the name 81, title 82 and XML standards 83 employed—eg. the ISML DTD standard and the message (output) standard. Optionally, they can also specify control dates 84—effective & expiry, product type/sub-type, product provider, associated documents (for printing) and whether it is for test purposes, in an input box 80.

Figure 9:
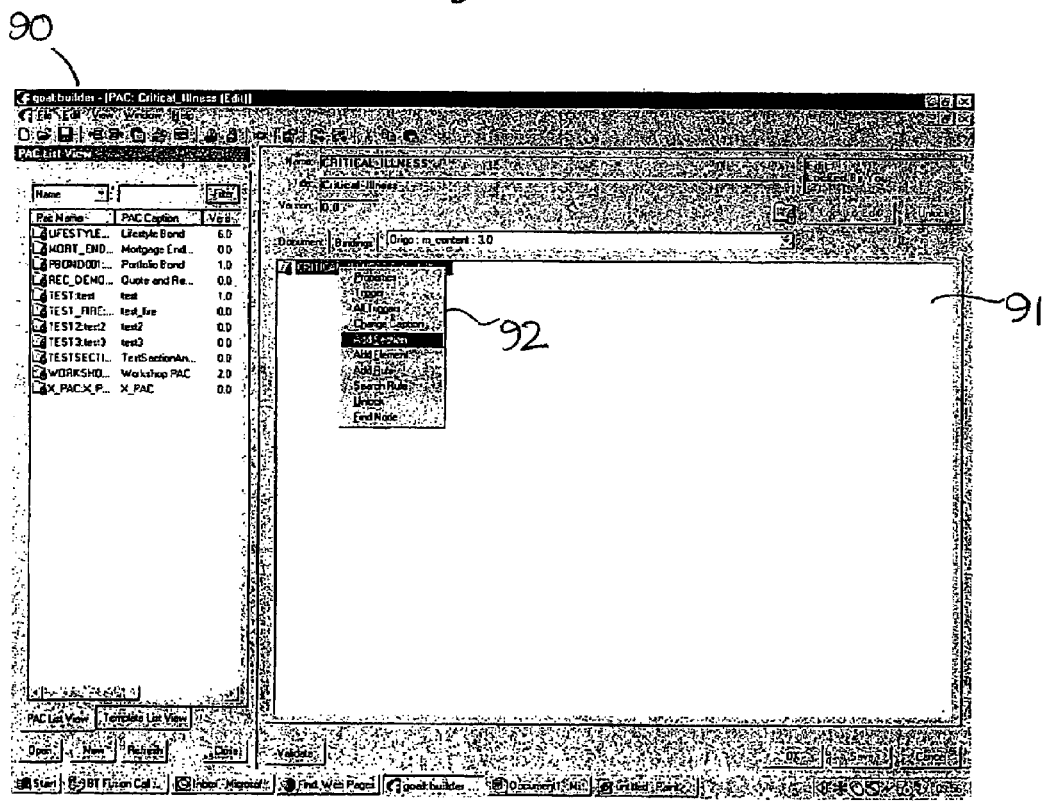
FIG. 9 is a screenshot of a form definition box for specifying sections, sub-sections and elements that will make up a form.

With reference to FIG. 9, in a second input box 90, in the main window 91 on the right, the architect 8 can define the sections, sub-sections and data elements in the sections and sub-sections that will make up the data capture form, by use of context sensitive menus 92.

Figure 10:
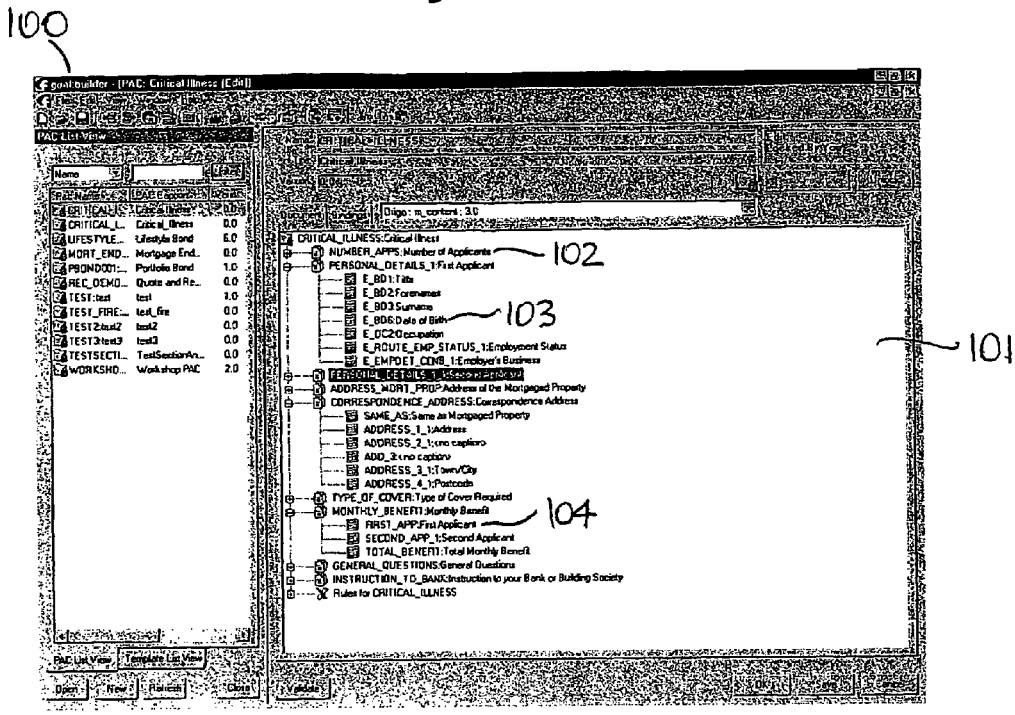
FIG. 10 is a screenshot of a form definition box indicating the hierarchical structure of sections, sub-sections and elements that make up a form.

With reference to FIG. 10, the content and structure of the form for presentation to a user during a data capture process is represented to the architect in display box 100 as a hierarchy tree 101, which is constantly updated as sections 102, sub-sections 104 and elements 103 are created. The hierarchy tree 101 is a logical representation of the relationship between data elements 103 and their respective sections 102 and sub-sections 104 which will be used to determine the layout of visual displays presented to a user during a data capture process.

The hierarchy tree 101 can be used to navigate the sections 102, sub-sections 104 and data elements 103, any of which items (referred to as "node") can be selected by the architect to view or set properties of that node, and perform functions. Examples of such functions include: add new section or element, copy item, paste item, delete item, make template, create or assign rules to triggers/events that occur as the data capture process is executed.

Figure 11:
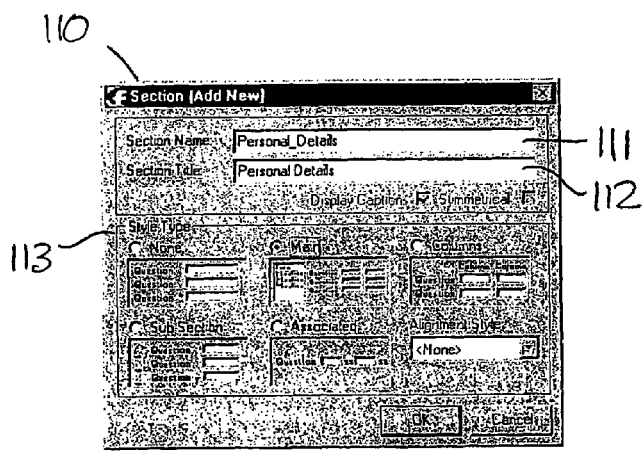
FIG. 11 is a screenshot of an input box for defining a new section in the form structure hierarchy of FIG. 10.

With reference to FIG. 11, to create new sections and sub-sections, the architect selects the type of section—either a main section, sub-section or variant—to bring up a new section input box 110, in which may be specified a section name 111 and a section title 112.

Main sections can be added to the form root, sub-sections and variants to main sections.

The input box 110 may also be used by the architect to specify attributes of the section, such as style type 113 which will affect the style of presentation of the section to the user during the data capture process.

Figure 12:
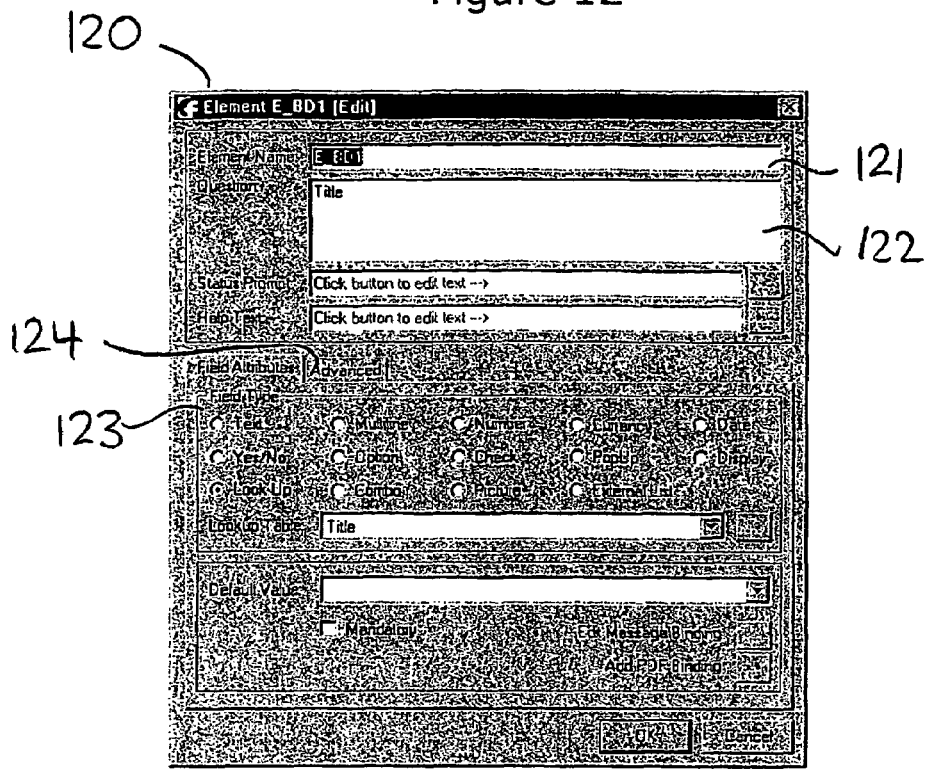
FIG. 12 is a screenshot of an input box for defining a new data element in the form structure hierarchy of FIG. 10.

With reference to FIG. 12, the input box 120 for adding an element is described. The architect 8 selects the respective section or sub-section that they wish to add an element to, and using the context sensitive menu, select to add a new element.

Each element is given a title 121, and a question or prompt 122 that will be displayed to the user during the data capture process. Elements can be of various types, including text, number, yes/no, lookup (list), etc., and mandatory and default values can also be specified.

Figure 13:
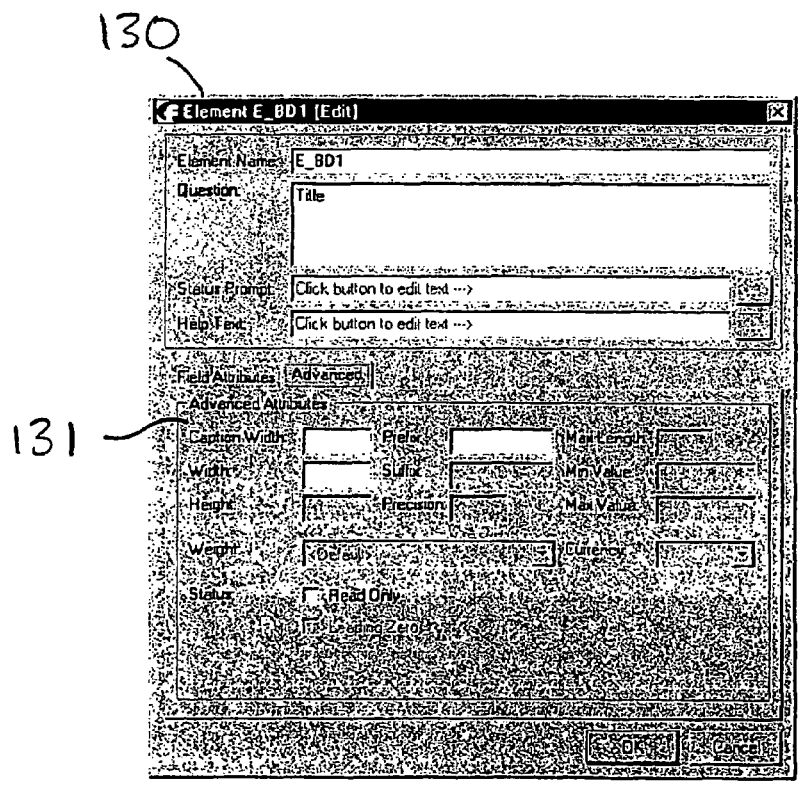
FIG. 13 is a screenshot of an advanced input box for defining a new element in a form structure hierarchy of FIG. 10.
Figure 14:
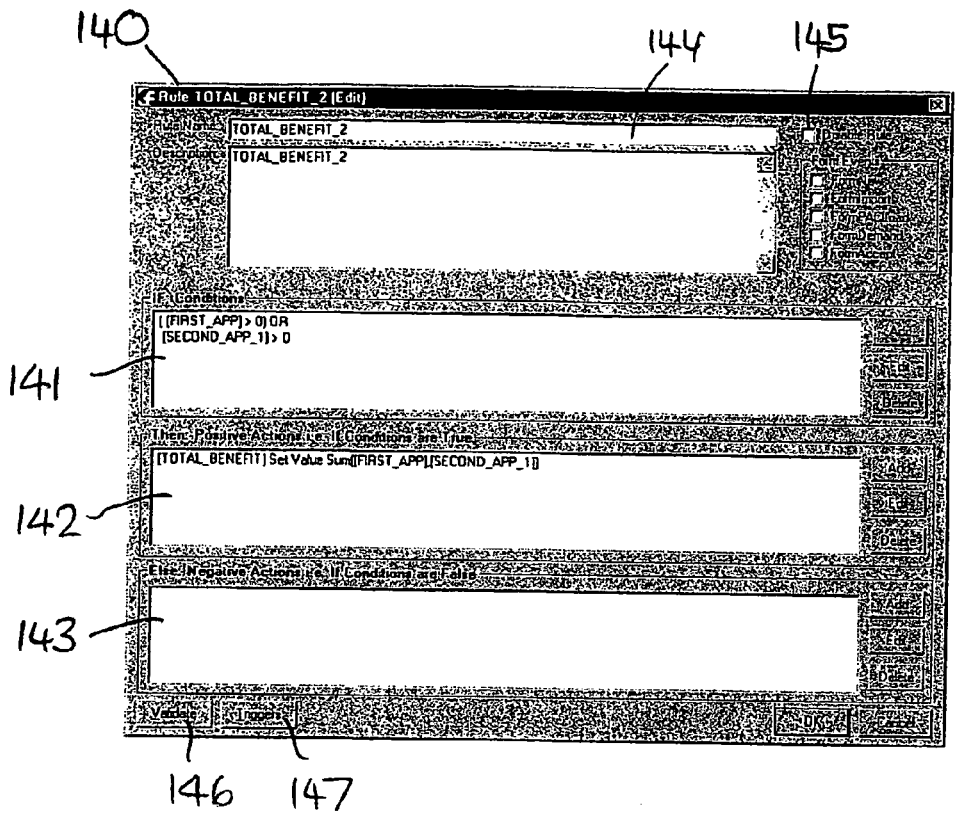
FIG. 14 is a screenshot of an input box for defining a new rule in a form structure definition process.

With reference to FIG. 13, an advanced input box 130 for element entry is shown. Input box 130 is called by using the advanced tab 124 in the input box 120 (FIG. 12). In advanced input box 130, the architect can also specify advanced attributes 131 of the prompts displayed to the user during the data capture process, such as: width, prefix, suffix, height, minimum and maximum values, read only, etc.

Again using the context sensitive menu 92 from a selected item in the hierarchical tree 101 (eg. section 102 or element 103), the architect 8 can call up a rule creation box 140 to create rules and assign them to the triggers or events that occur when the data capture process is executed, such as form load, element change, section enter/leave, etc. This defines the form function 2.

Rules take the form IF the condition is true, THEN perform these actions, ELSE perform these different actions, as defined in the IF THEN ELSE boxes 141, 142, 143. Rule conditions 141 can have multiple actions 142. Further options are available, such as disable rule 145, validate rule 146—to check the rule logic is valid, and view triggers 147—to see which events (triggers) the rule is assigned to.

Figure 15:
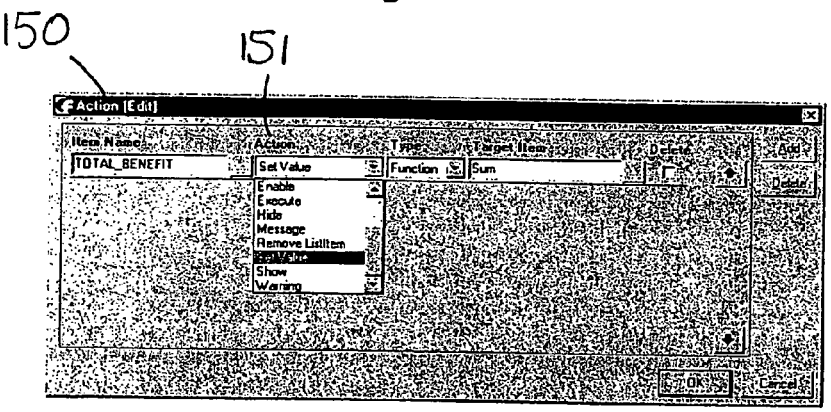
FIG. 15 is a screenshot of an input box for defining actions under a rule in the form structure definition process.

As shown in FIG. 15, a rule action edit box 150 enables the setting of rule actions 151 which include: set a value to an element, perform a function (such as validate a postcode or make an external call for information or validation), enable/disable, hide/show, display a message or warning, execute another rule, etc.

Figure 16:
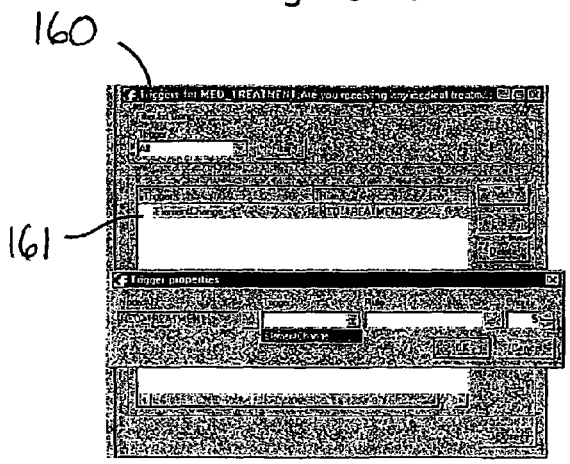
FIG. 16 is a screenshot of an input box for defining event triggers for rules in the form structure definition process.

Rules are assigned to triggers (events) by first selecting the event associated with the section, element or form, such as Formload, section enter/leave, element change, etc; and then specifying the rule to be triggered when the event occurs in real-time as the form is executed during the data capture process. FIG. 16 shows a viewing and editing box 160 for triggers and their properties. An event (trigger) can have multiple rules assigned listed in window 161 (with priorities set to define the order of execution), and a single rule can be assigned to multiple events (triggers) as required.

Figure 17:
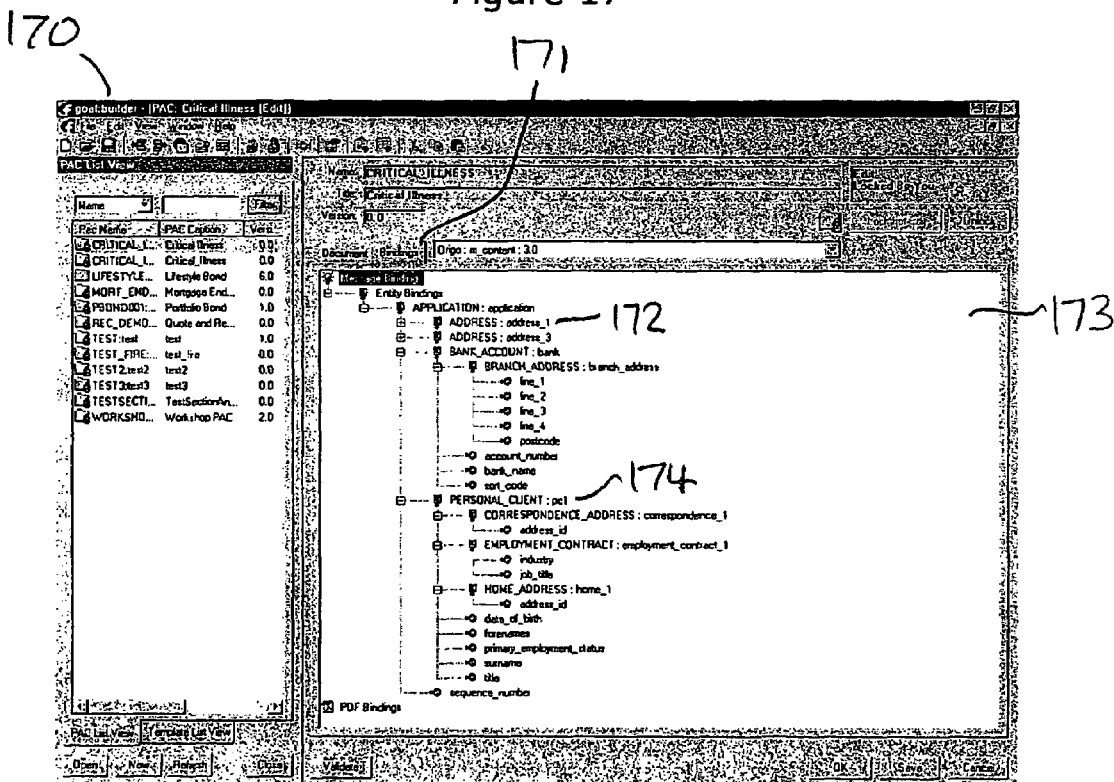
FIG. 17 is a screenshot of a form structure definition box indicating a binding or mapping of each of the hierarchical form sections, sub-sections and elements with a corresponding data exchange destination entity.

Forms can be bound to a standard data model, so that the captured data (referred to as the message) can be easily exchanged between systems using the same data model. Within the application 30, the main control box 100, also now shown in FIG. 17 as control box 170, can also display (by using the bindings tab 171, the bindings for each data item with an external data model. The architect defines the bindings using context sensitive menus.

The data element bindings 172 are also displayed in a hierarchical tree 173, consisting of the message entities, eg. personal client 174, and the message attributes, eg. home address. The hierarchical tree 173 can be used to navigate the data element bindings, where any item (referred to as node) can be selected to view or set properties, and perform functions, such as add new entity or attribute, copy, paste, delete, etc.

The process of creating the bindings 172 consists of defining the message entities, eg. personal client, and then mapping the data elements 103 as presented on the form displayed during data capture to the attributes of the message entities, eg. mapping home address from the personal details section in the form to the home address attribute of the personal client entity.

Figure 18:
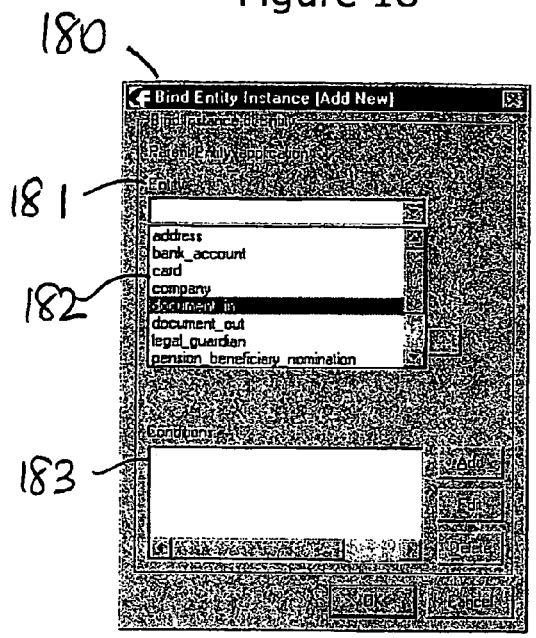
FIG. 18 is a screenshot of an input box for adding a new binding entity used in the data exchange definition.

The selected message standard will contain a number of entities, which represent the topic or subject of data, eg:

personal client. The architect can select, using box 180 in FIG. 18, to add an entity 181 from the list of available entities 182 within the message standard and define properties. If the message is hierarchical, then the application 30 will preferably only allow the architect to select the entities applicable to the position in the hierarchy.

Figure 19:
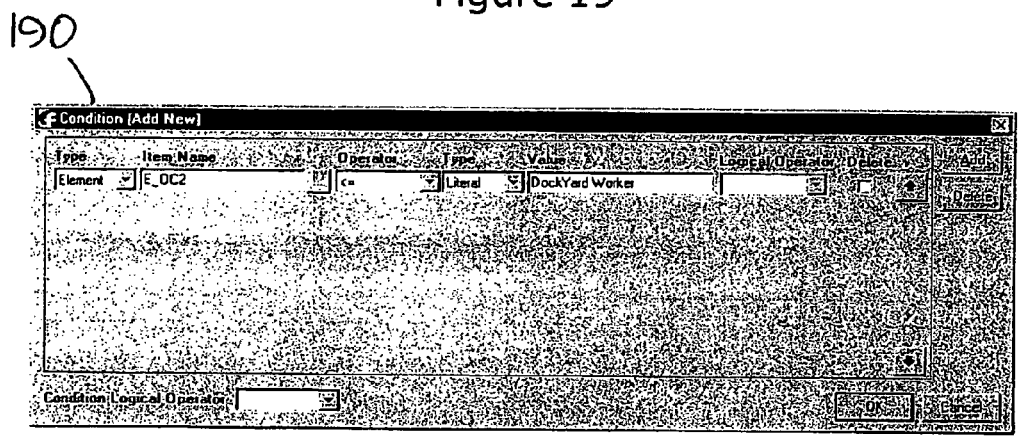
FIG. 19 is a screenshot of an input box for defining binding conditions in the data exchange definition.

The architect can specify a condition 183 upon which the entity 181 is bound to the form, eg: IF Age is less than 70 THEN bind the entity to the form. Complex binding conditions can be created using logical AND and OR conditions, using the add new condition box 190 in FIG. 19, eg. IF the Age is less than 70 OR the Age is greater than 25.

Each entity in the message standard employed, has a set of defined attributes, eg. in the example of the personal client entity, one attribute is the home address, another is surname, etc.

Figure 20:
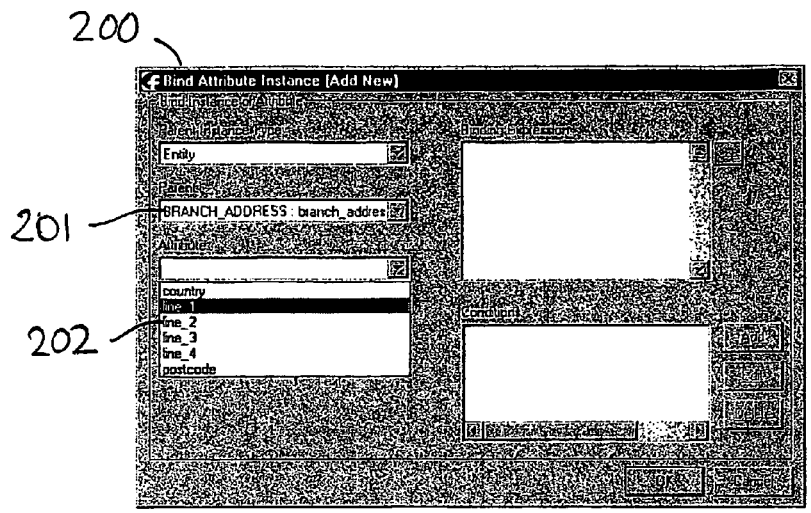
FIG. 20 is a screenshot of an input box for defining attributes of binding entities in the data exchange definition.

As shown in FIG. 20, the architect can select an entity 172, 201 (from the bindings tree 173) and, using the bind attribute instance box 200, add relevant attributes 202, and define the form element(s) to bind.

Figure 21:
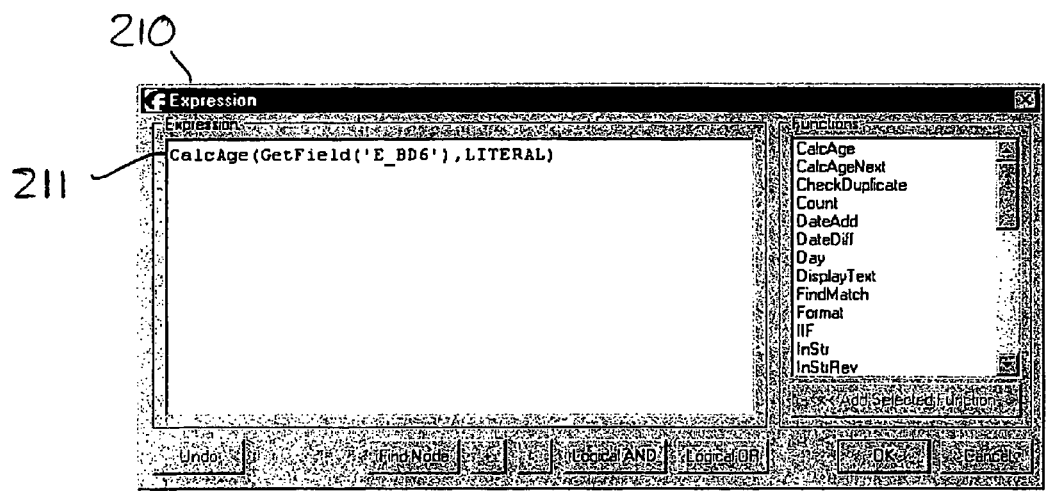
FIG. 21 is a screenshot of an input box for binding an evaluation expression to an element in the hierarchical form definition and data exchange definition.
Figure 22:
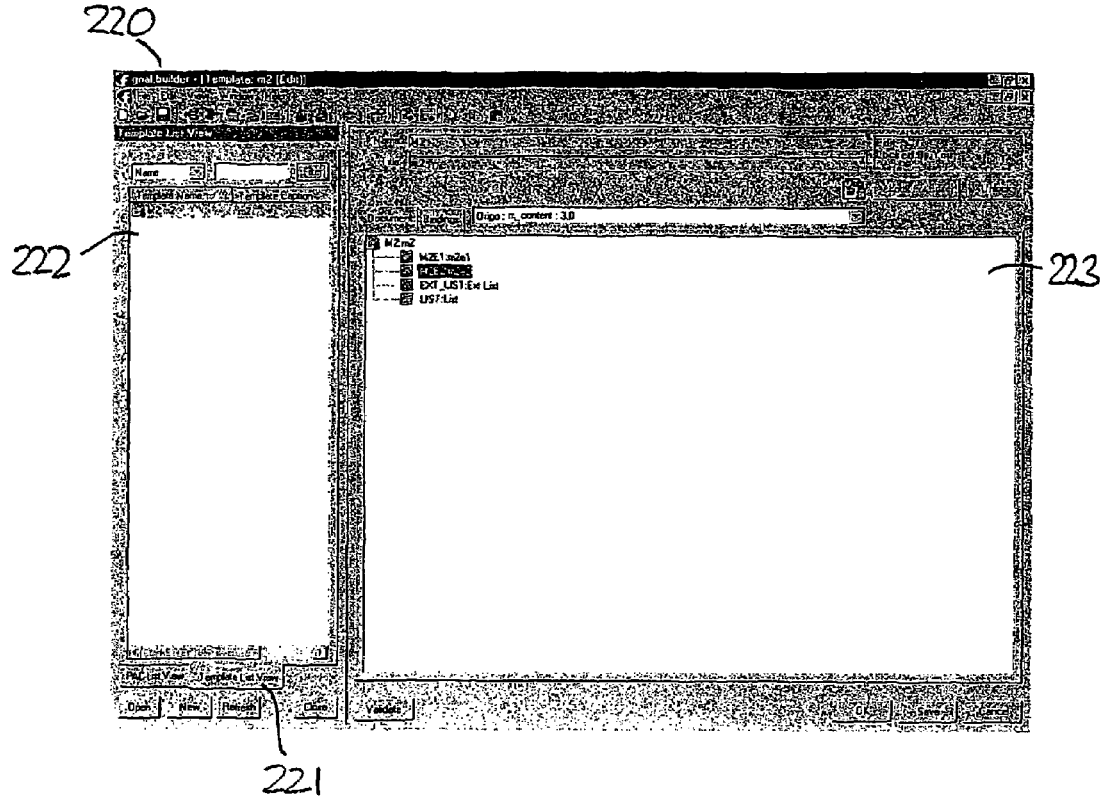
FIG. 22 is a screenshot of a template definition box for specifying sections, sub-sections and elements that will make up a template form.

With reference to FIG. 21, optionally, attributes 202 can be bound to an expression 211 instead of directly to a form element, eg. the age attribute could be bound to an expression—calcage (date of birth), using expression definition box 210.

In a preferred embodiment, templates form an important role in the creation and maintenance of data capture definition files, because they can greatly reduce the effort to build and maintain them, whilst enabling multiple architects to work on the same data capture definition file.

A template is a master copy of a part (or can be entire) data capture definition file, such as personal details. The template can be copied into existing data capture definition files, to form part of that file, or into another template to form part of that template, and so on.

When a template is copied into another data capture definition file or template, it is linked to the original so that when changes are made to the original template, they can be propagated to the copies that exist for other data capture definition files.

Templates can be created in any combination of the following ways.

1. In exactly the same method as creating a normal data capture definition file, described above in connection with FIG. 10, except that the template is created using the template tab 221 in window 220 (FIG. 220) to select a list 222 of templates. The hierarchical tree 223 of the selected template is displayed in the right hand window.

2. By making a template from an existing section or element by selection of part of a tree 101.

Figure 23:
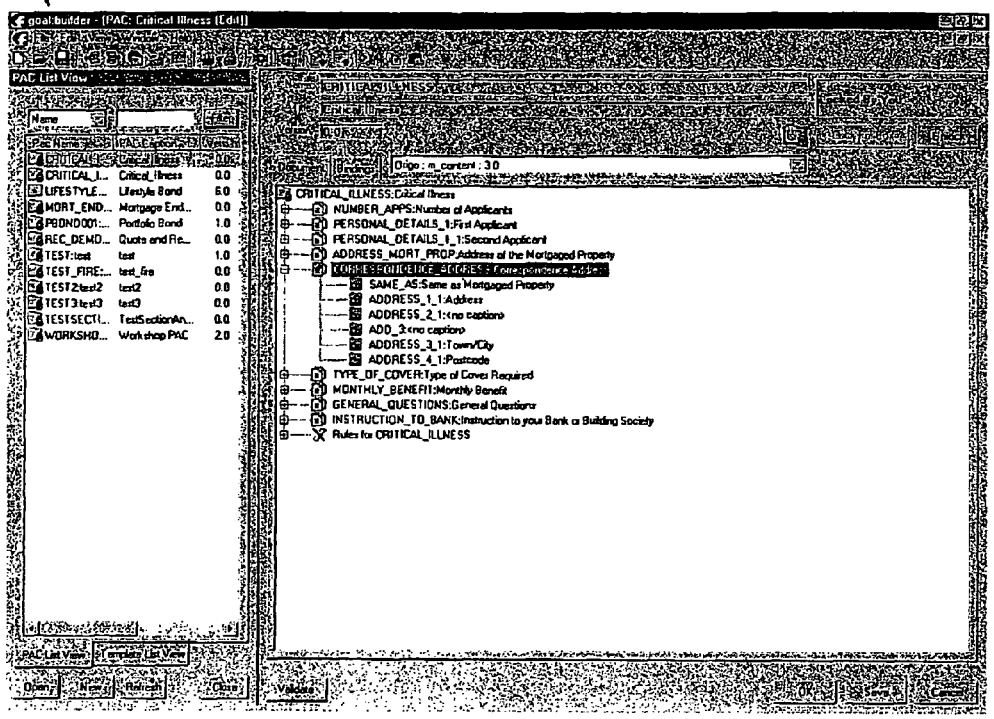
FIG. 23 is a screenshot of a template definition box indicating the hierarchical structure of sections, sub-sections and elements that make up a template form.
Figure 24:
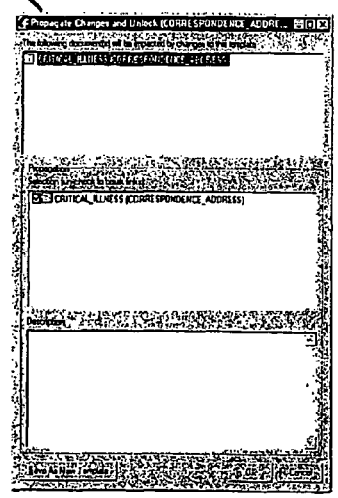
FIG. 24 is a screenshot of a propagation instruction box defining actions to be taken on change in a template.

A template may be copied into a form or other template, by simply dragging the template from the left hand window to the form/template in the main window. The template becomes part of the form/template, but is distinguishable by a different colour as shown in FIG. 23.

When changes are made to the original template, the changes are marked for propagation so that other data capture definition files or templates that use the template are notified of the changes and can receive those changes. These are shown to the architect in a propagation box 240.

Figure 25:
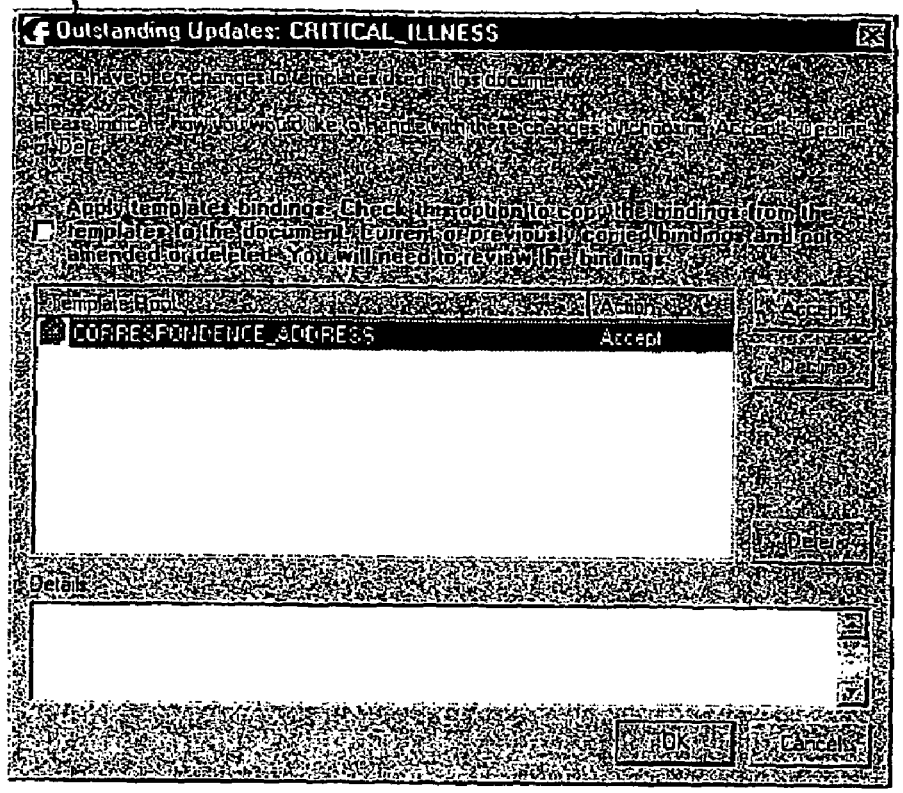
FIG. 25 is a screenshot of a template change update box used to alert an architect of changes to a template.
Figure 26:
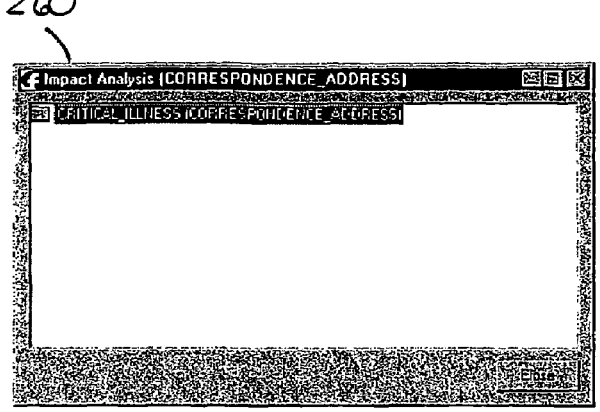
FIG. 26 is a screenshot of an impact analysis box to indicate the impact on existing forms resulting from changes to a template.

When a data capture definition file is accessed that uses a changed template, the architect is notified of the changes and can accept or reject them using a change control box 250 in FIG. 25.

When making changes to templates, in the preferred embodiment an impact analysis box 260 is available to determine the impact the changes will make by listing the affected forms and templates.

A template contained within a data capture definition file or other template can have it links broken form the original template so that changes are not propagated. When a template within a data capture definition file or other template 'breaks links' with the original, it is no longer a template and appears in the same colour as the rest of the form content.

In the creation or maintenance of an existing form, there are a number of features and functions available to the architect.

Figure 27:
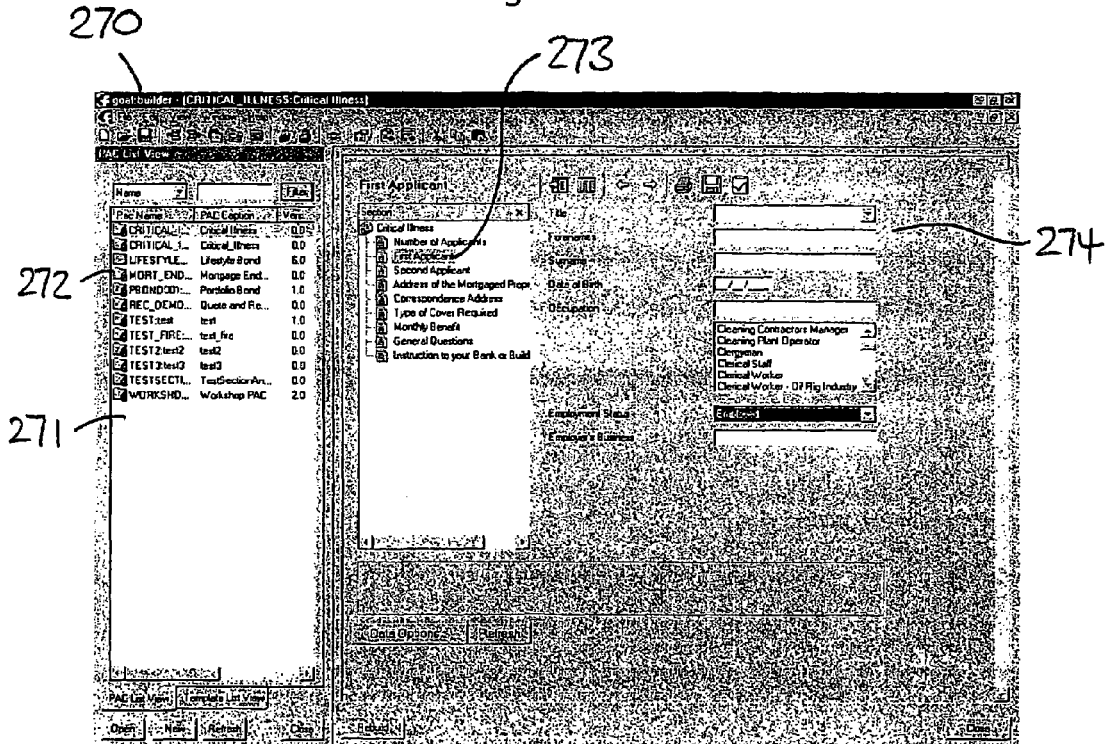
FIG. 27 is a screenshot of a preview box illustrating the sections, subsections and elements in a selected form definition.

As shown in FIG. 27, in the left hand window 271, a current list of existing defined data capture definition files 272 are listed, which can be selected to perform form level functions. Ability to perform these functions preferably depends on whether the selected data capture definition file is locked for editing (possibly by another user), the user's rights, and the rights set on the form by the form owner/creator.

Any existing data capture definition file can be copied in its entirety as a new file, which can be easily edited as required, using a copy function.

The selected form can be versioned (eg. a major version number increased) or revised (minor version number increased). In both cases, the data capture definition file is copied, and the new copy has a newer version or revision number.

The selected data capture definition file can be locked for editing if unlocked, or unlocked if locked, so that others may edit it.

The selected data capture definition form may be displayed in tree view 101 in the right window (as shown in FIG. 10), where the contents and properties of the form can be viewed, and (if locked for edit) edited.

Alternatively, the selected section 273 or sub-section of the data capture definition file may be shown 274 as it would be shown to the data capture user during the data capture process, ie. as it would be executed by the presentation layer 7 in real-time for the data capture user. This enables the architect to test functionality and view exactly how the resulting form sections would appear to the end-user.

Figure 28:
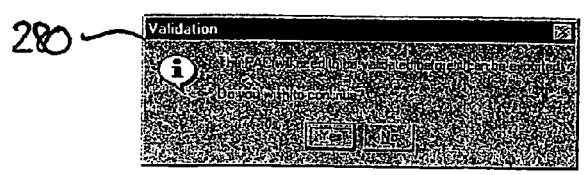
FIG. 28 is a screenshot of an export validation control box.
Figure 29:
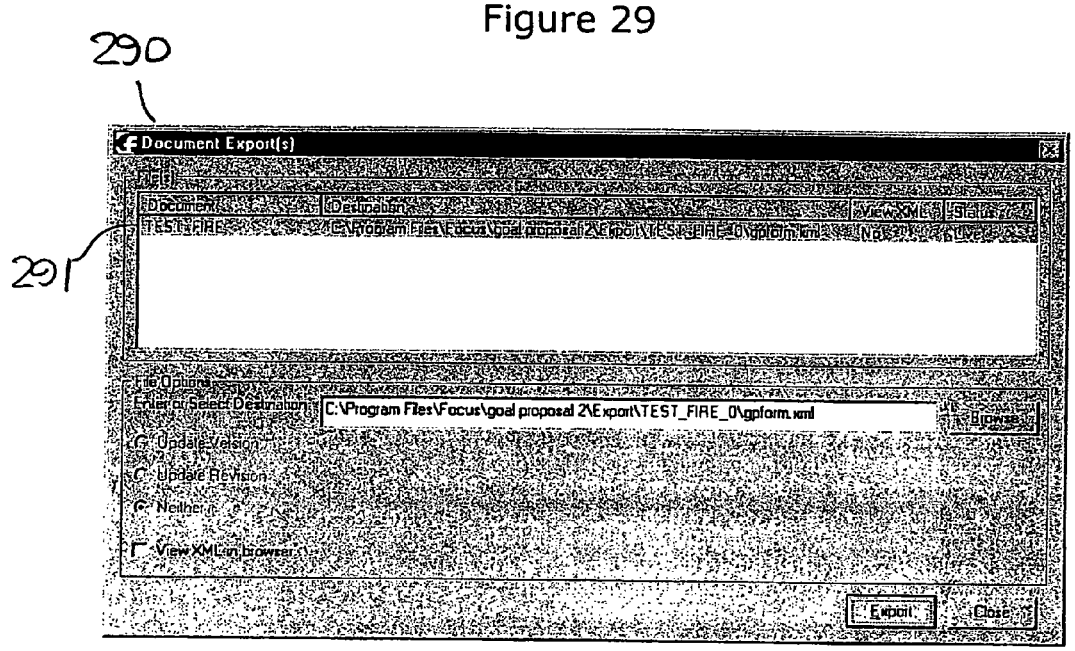
FIG. 29 is a screenshot of an export destination definition box for use in the data exchange definition.

With reference to FIG. 28, the selected data capture definition file is preferably first validated (using control box 280) against the form standard 4. The validated document may then be exported using export control box 290, to destination address as specified at window 291, as a portable self-contained XML document 17 in proprietary format. The data capture definition file 17 can be imported into the same or other installation of the application 30 as required.

Figure 30:
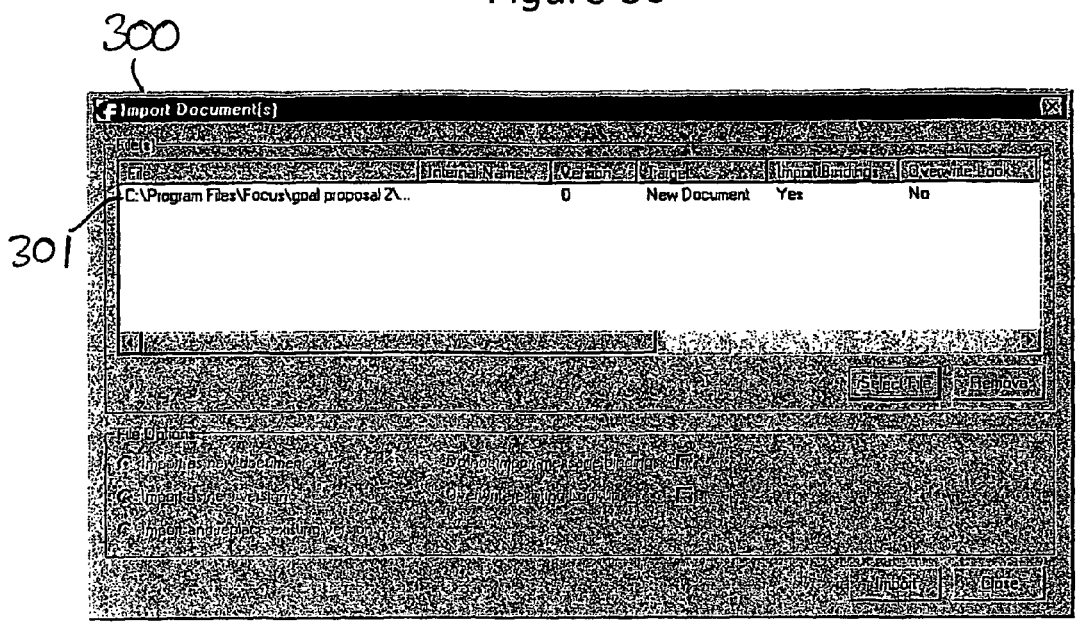
FIG. 30 is a screenshot of an import destination definition box for use in the data exchange definition.

During import, as shown in FIG. 30, using import control box 300, the selected data capture definition document is first validated against the form standard 4 employed and then imported into the application's repository 34 at the address indicated by window 301, where users can access it in the normal way.

Figure 31:
FIG. 31 is a screenshot of a form definition release control box.
Figure 32:
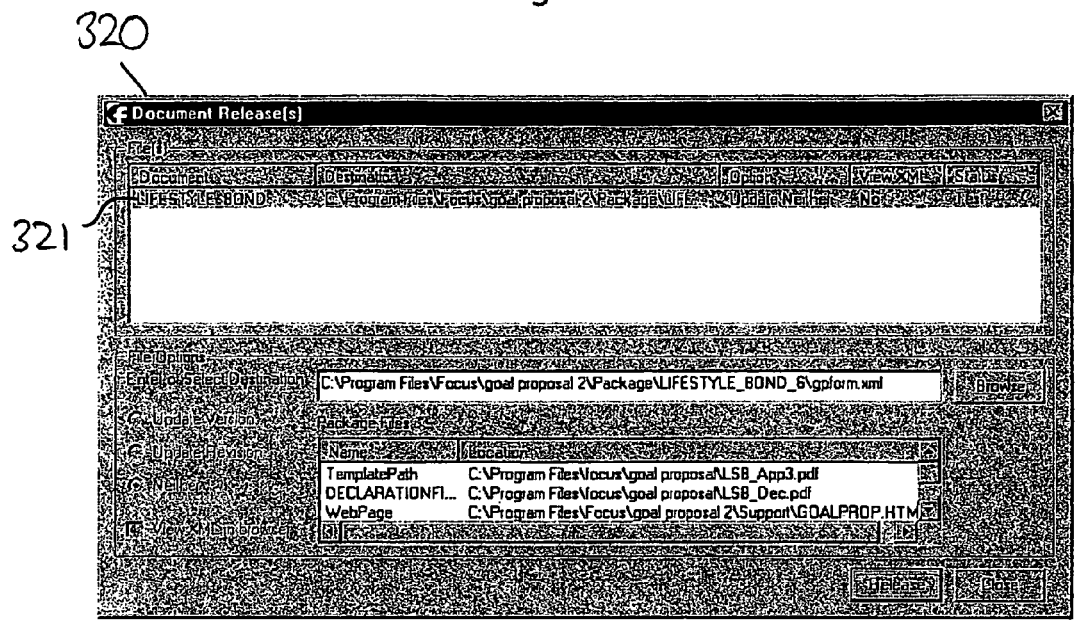
FIG. 32 is a screenshot of a form destination release definition box.

The selected data capture definition file is first validated against the form standard 4 employed using validation control box 310 (FIG. 31) and then released (release control box 320 in FIG. 32) as portable self-contained XML document 321 in the standard format employed where it can be deployed for execution at the presentation layer 7—eg. on a stand-alone desktop, on an online server/client browser environment, etc.

Figure 33:
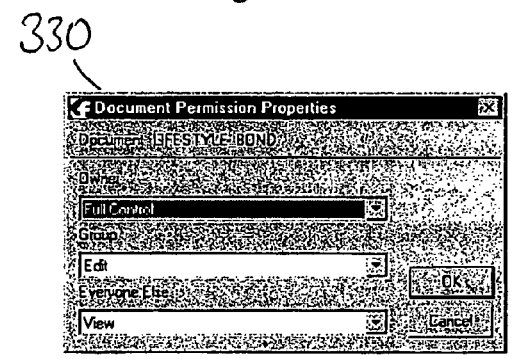
FIG. 33 is a screenshot of a document permission properties input box for entering ownership and use properties of form definition files.

Permissions for a selected data capture definition file can be viewed and/or changed accordingly using a document permission properties control box 330 shown in FIG. 33.

Selected elements, sections or rules can be copied and pasted within or between data capture definition files using a copy/paste function. The properties of a selected section, element or rule can be viewed and/or changed as required (providing the form is locked for edit).

Figure 34:
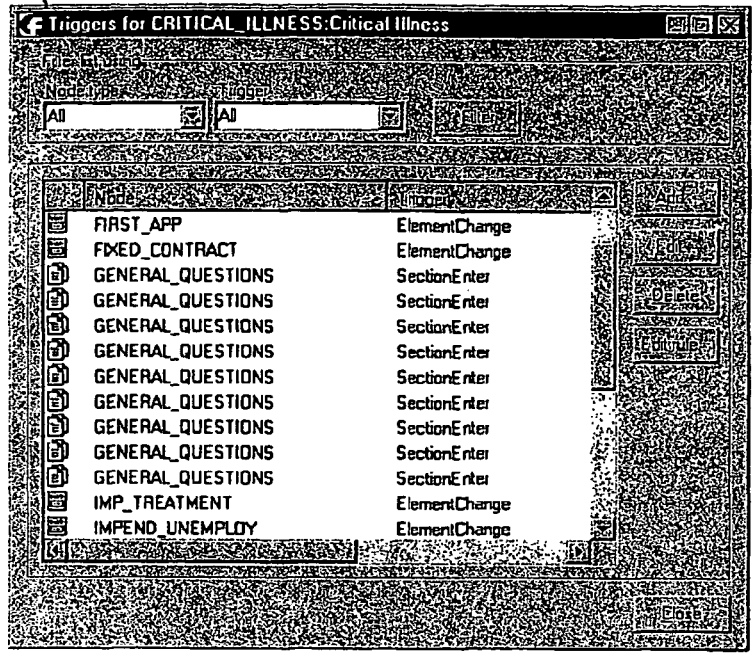
FIG. 34 is a screenshot of a trigger list display box showing all triggers defined in a form definition.
Figure 35:
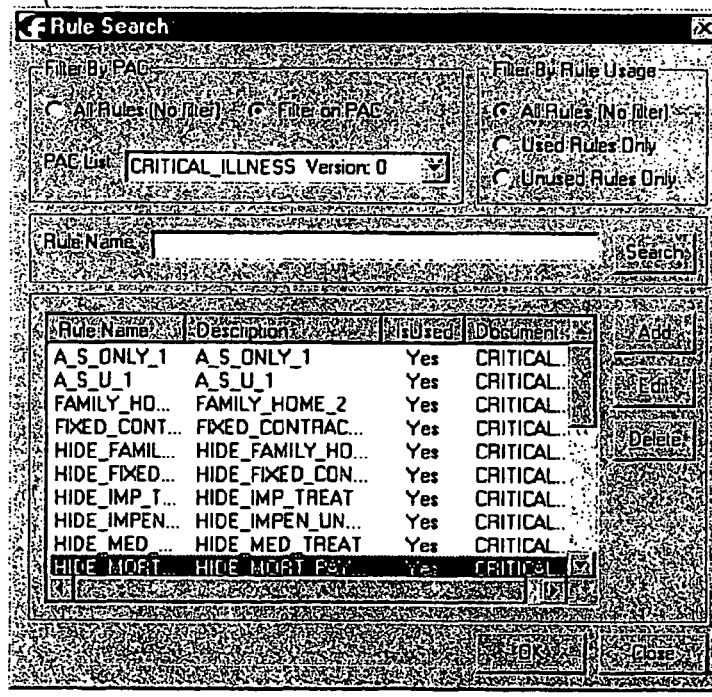
FIG. 35 is a screenshot of a rule list display box showing all rules defined in a form definition.

A trigger dialog window 340 (FIG. 34) may be displayed showing all events (triggers) which have rules assigned. The rule dialog window is displayed showing all rules, and provides a search function shown as search control window 350 (FIG. 35).

A move up/down function may be provided to move a selected element, section or rule up or down within the same level in the data element tree hierarchy.

Figure 36:
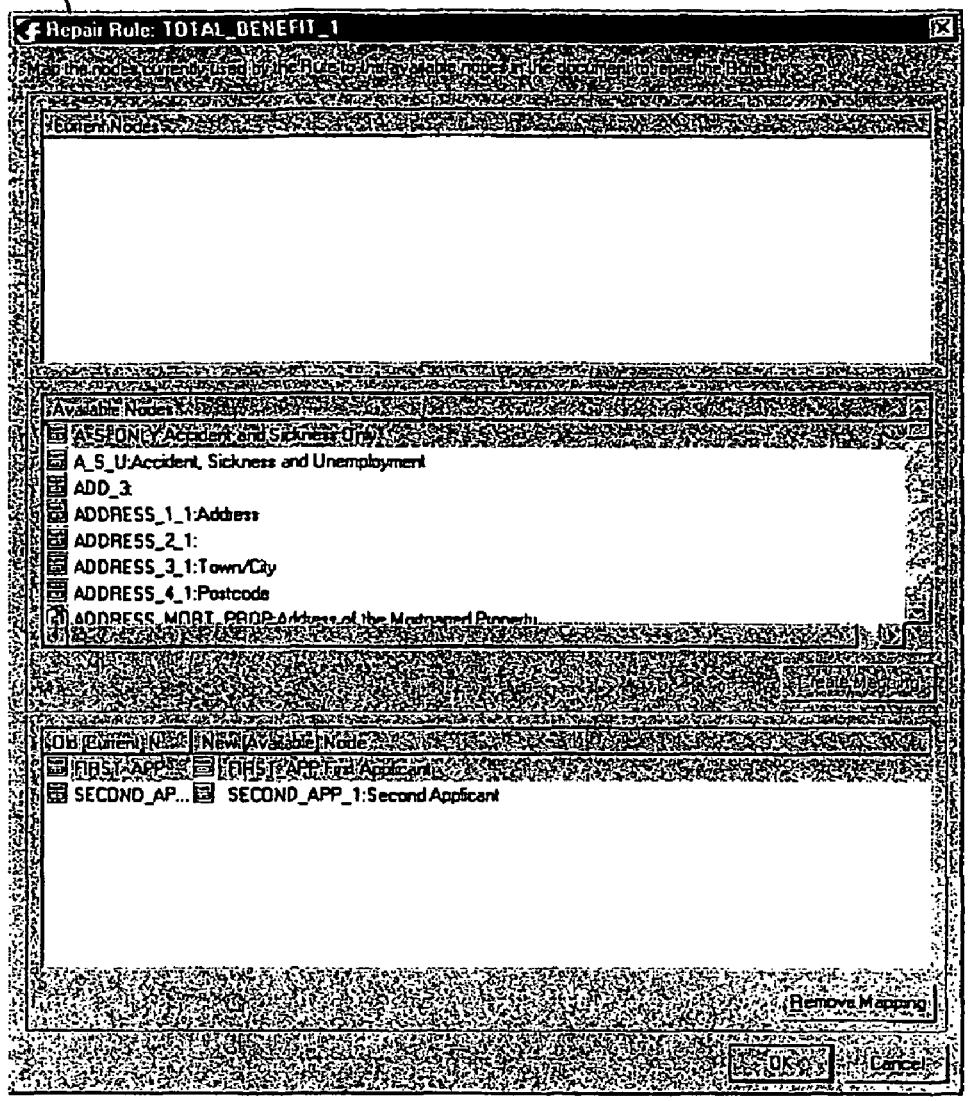
FIG. 36 is a screenshot of a rule repair input box for correcting invalid rule assignments.

When rules are copied between different forms or elements/sections are deleted upon which rules were assigned to their events (triggers), the rule can be considered as broken—that is it does not have a valid assignment. To assist, a repair rule feature is available as shown in the rule repair control box 360 in FIG. 36. This control box facilitates the identification and correction of invalid assignments.

Sections, elements and rules can be dragged and dropped within the same data capture definition file or between data capture definition files. When dragging/dropping between the same file, the item is moved, whereas when the item is dragged/dropped between forms the item is copied.

In a make template function, the selected section or element becomes a template.

As discussed previously, once a data capture definition file 17 has been generated, this file may be executed by the presentation/execution layer 7, which is platform independent, during a data capture process. The presentation/execution layer performs the function of displaying a plurality of visual displays, to a data capture user 18, that prompt the user to enter data corresponding to each relevant data element in the data capture definition file.

The layout of each visual display is determined, by the presentation/execution layer, according to the logical relationship between the sections, sub-sections and data elements which are defined by the hierarchical structure in the tree 101. The data capture definition file 17 does not contain any instructions relating to absolute physical positioning of questions and prompts on the visual displays presented to the user during runtime of the data capture process. Only relative physical positioning of user prompts for data element capture, and the sequential progression of user prompts for data element capture are inferred from the data element hierarchical tree by the presentation/execution layer.

Figure 37:
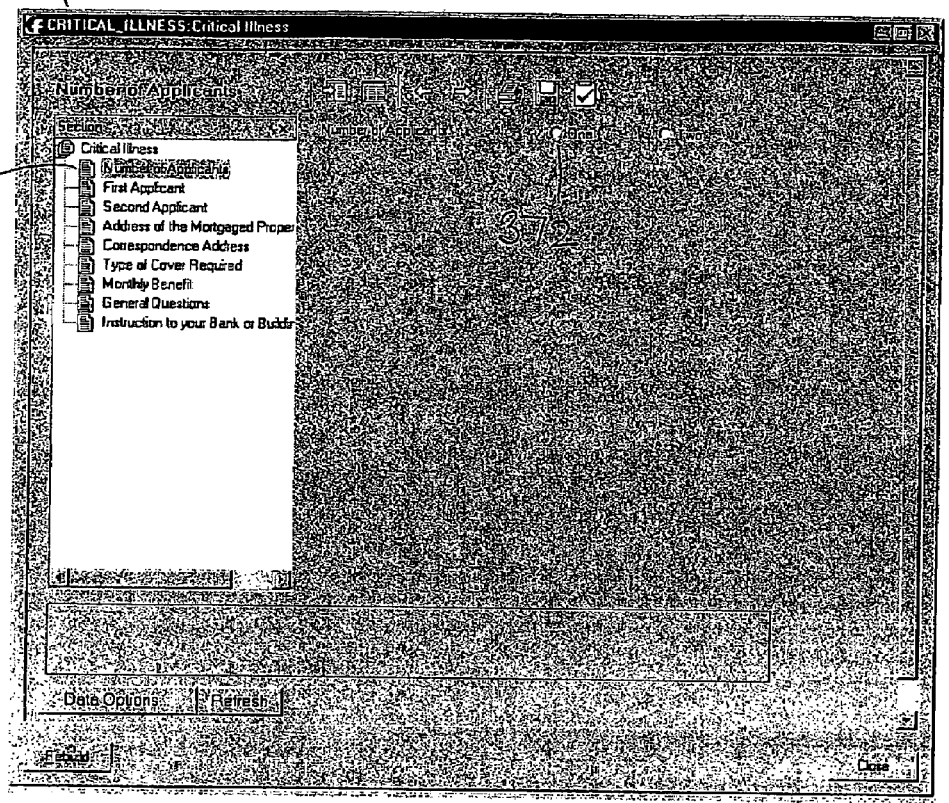
FIG. 37 is a screenshot of an initial user input screen for data capture, showing form sections to be filled in by the user.
Figure 38:
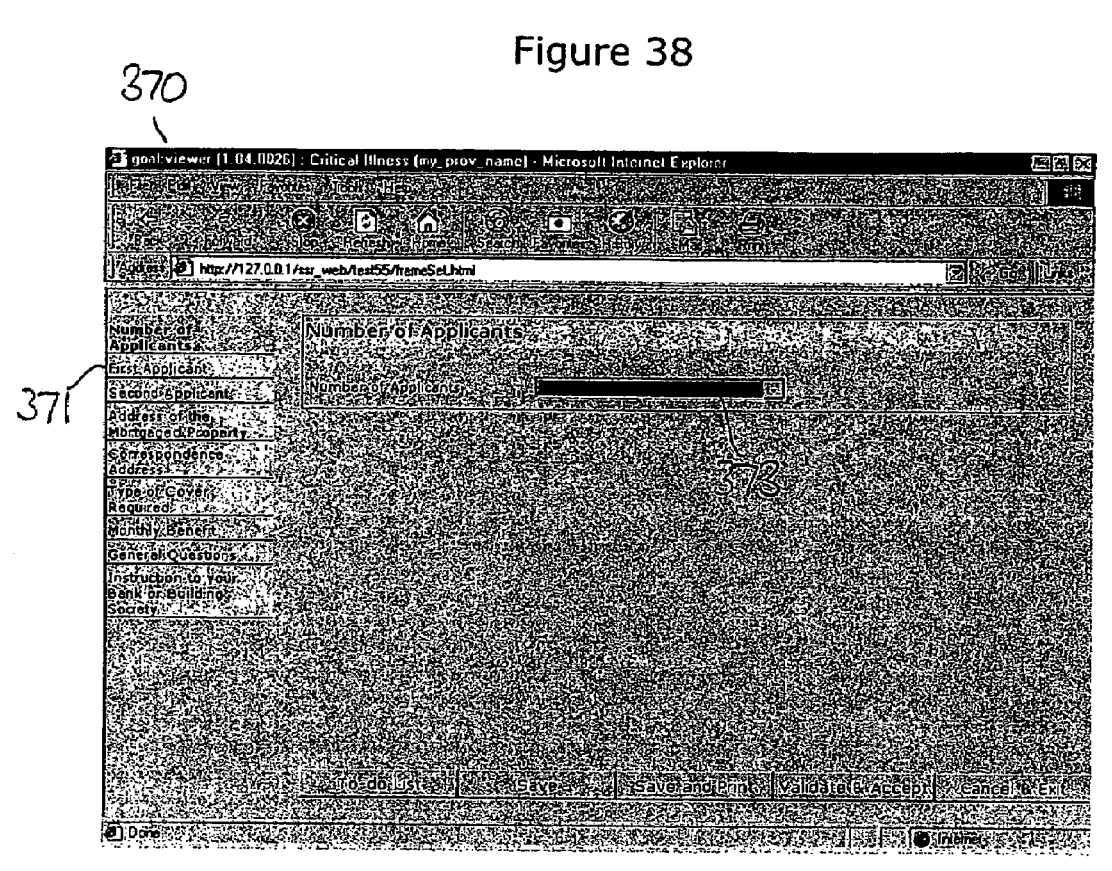
Figure 39:
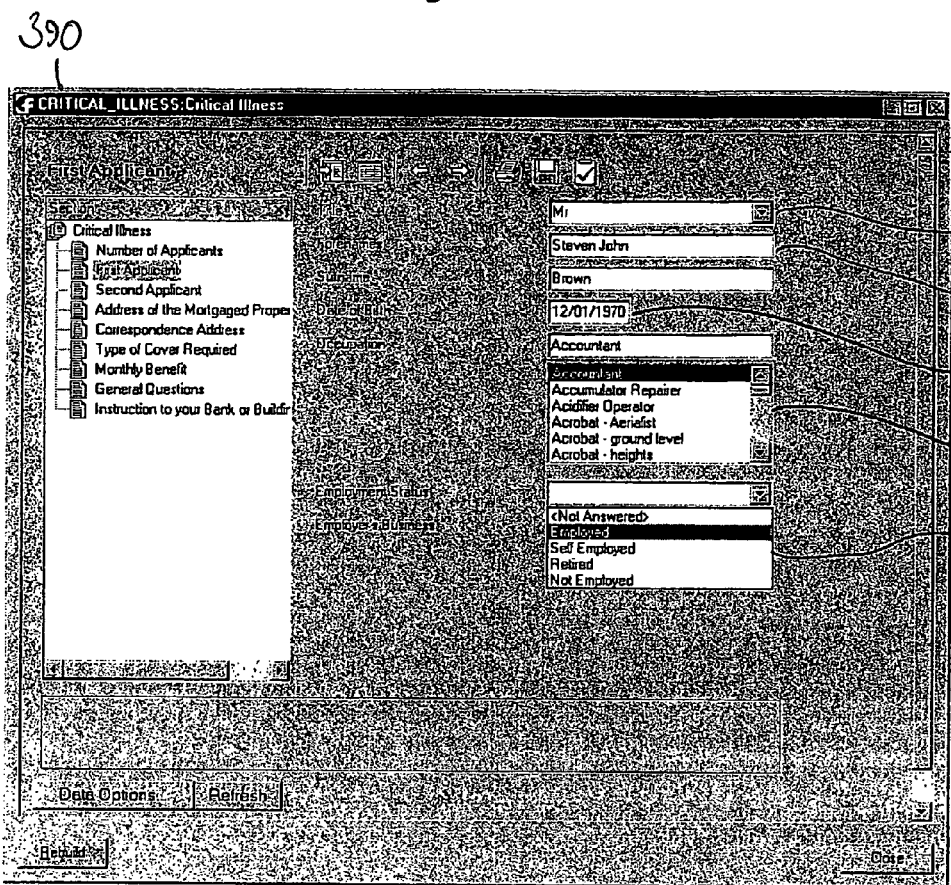
FIG. 39 is a screenshot of a user input screen resulting from completion of data entry in the screen of FIG. 38.
Figure 40:
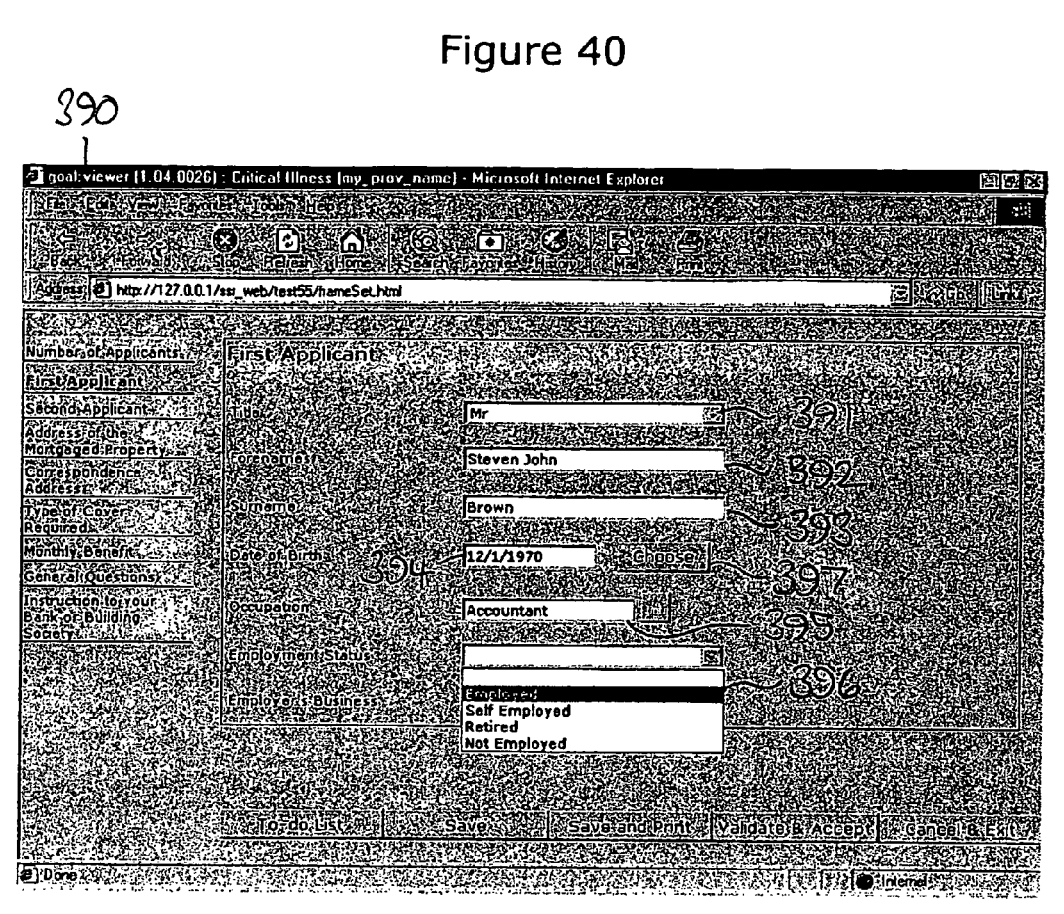

As illustrated in FIGS. 37 and 38, respectively corresponding to a stand-alone PC version of the presentation/execution layer 7, and a web-based version, a first visual display 370 presents option box prompts to the user for data input corresponding to a first section "number of applicants" of the data element tree. The prompts may be displayed either as click boxes 372 or as drop-down selection box 373, depending upon the application running the presentation/execution layer. FIGS. 39 and 40 illustrate corresponding user input screen for data entry during the data capture process. In each case, the format and positioning of each of the data input prompts 391 to 395 is determined during runtime of the data capture process according to the data element hierarchy and data type.

For example, in the first applicant details user prompt display screen 390, the data elements have equal status or level within the hierarchical tree within one sub-section, and are therefore displayed accordingly by the presentation/execution layer 7 as a single column.

Similarly, the data capture process 7 detects that the data type for "title" 391 has a plurality of allowed values (Mr, Mrs, Ms, Dr etc) and therefore interprets the user input prompt as a drop down menu. Similarly, the process detects that the data type for "Forenames" admits of freeform text input of maximum length n characters, and provides an appropriate text input box 392. The "date of birth" element is detected as data type "date" and is therefore presented as a date format input box 393.

It will be understood that the data capture process running on the presentation/execution layer interprets the hierarchical data element tree to determine that sections and certain sub-sections of data element prompts should be presented on independent "pages" or screens, each element being afforded a presentation status dependent upon its ranking in the tree. Thus, user prompts for elements having a common sub-section are preferably presented in either column, row or matrix format with each element prompt having equal "status" in the presented display. The order of the element prompts may be determined according to the sequence of the elements in the tree. Prompts corresponding to separate sub-sections on a common display page may be incorporated within separate frames or separated by appropriate boundary structures.

Different sub-sections may be presented on separate display pages, or on the same displays depending upon the number of data element prompts required, and the sizes of those prompts. The data capture process makes a determination, during runtime, of the best fit for each set of user prompts according to the size, content and complexity of the prompts required by the data capture definition file.

Because the layout of the form presented to the user is determined during runtime of the data capture process, the data capture process can make allowance for the restrictions imposed by the user display in terms of screen size, display resolution, colour, availability of graphics etc. Similarly, the data capture process can accommodate use of any suitable available icons or graphics available for certain types of data entry. For example, for date entry at prompt 393, only a procedure for numeric keyboard entry might be available in FIG. 39, whereas in the web-based version of FIG. 40, a separate procedure call for a date entry subroutine 397 might be available.

Figure 41:
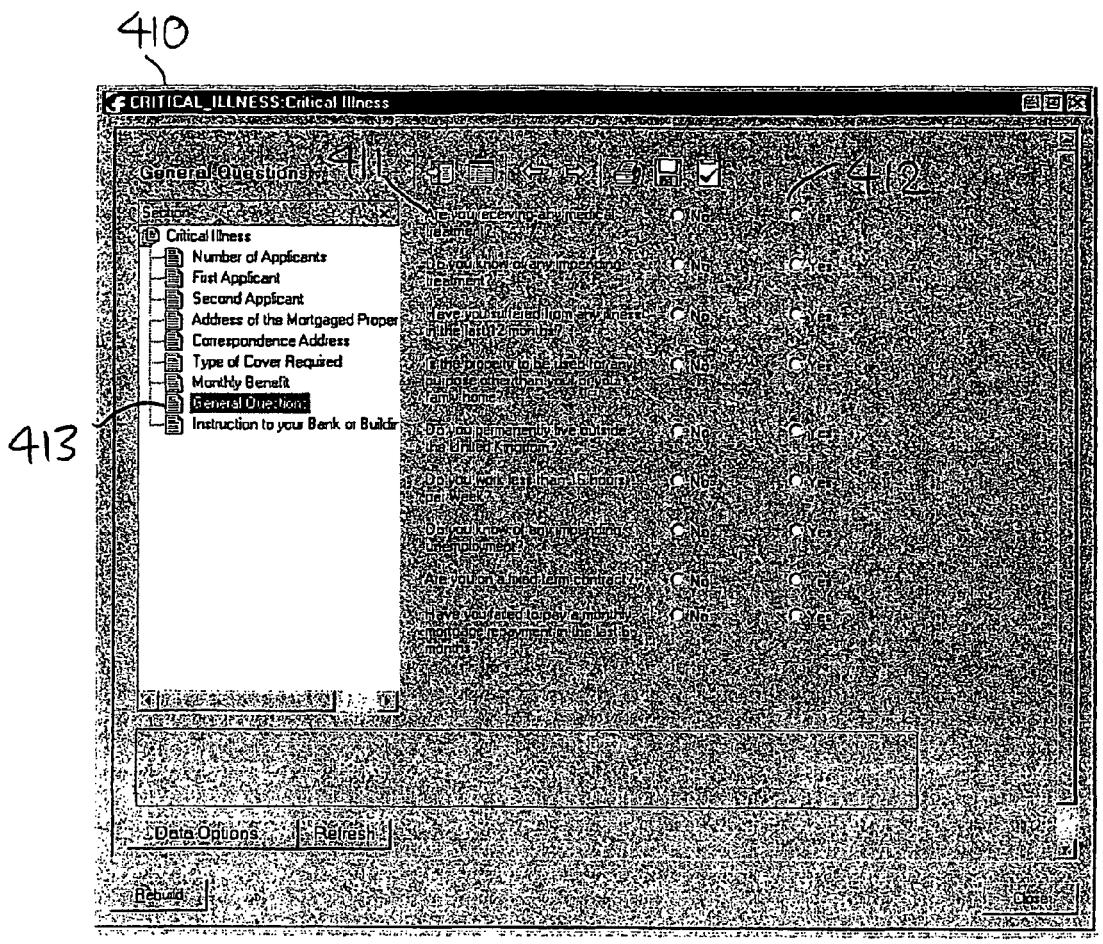
FIG. 41 is a screenshot of a user input screen for providing as input data corresponding to a general questions section of the form.

In FIG. 41, a user display 410 of prompts 411 for input of data corresponding to a series of "yes/no" data elements 412 of equal status within a "general questions" section 413 is shown.

Figure 42:
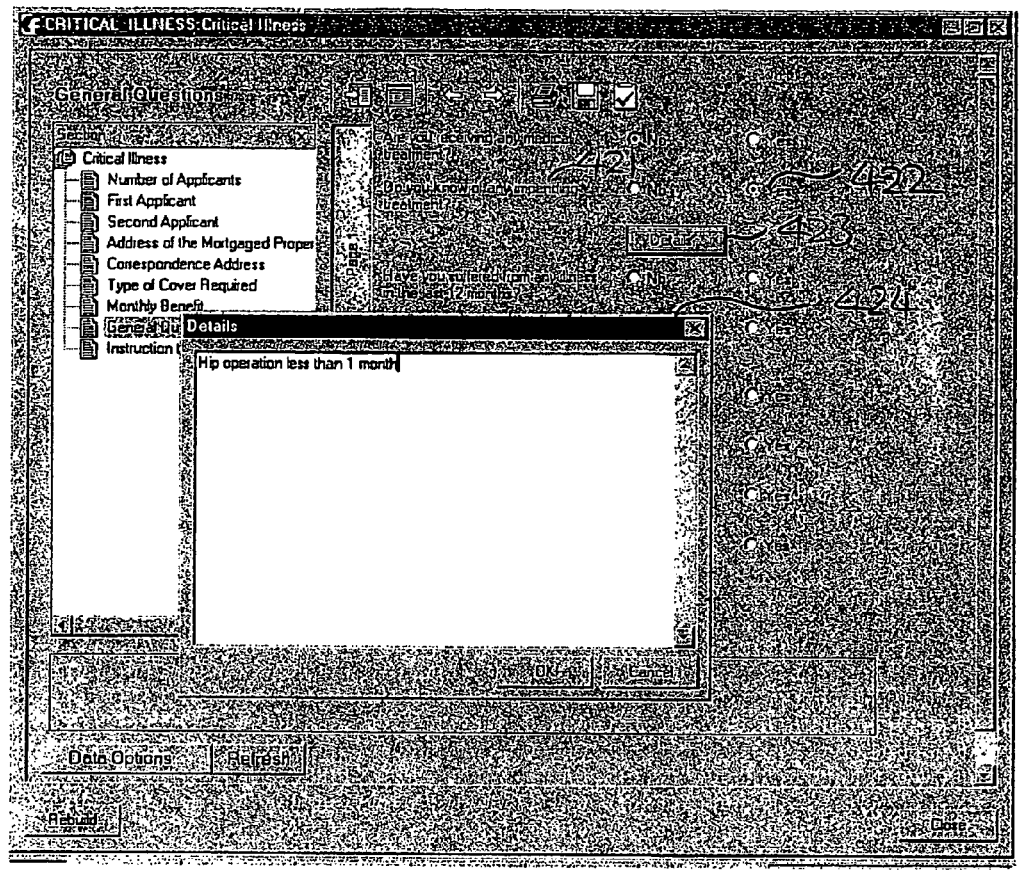
FIG. 42 is a screenshot of a user input screen resulting from input "yes" to one of the general questions of FIG. 41.
Figure 43:
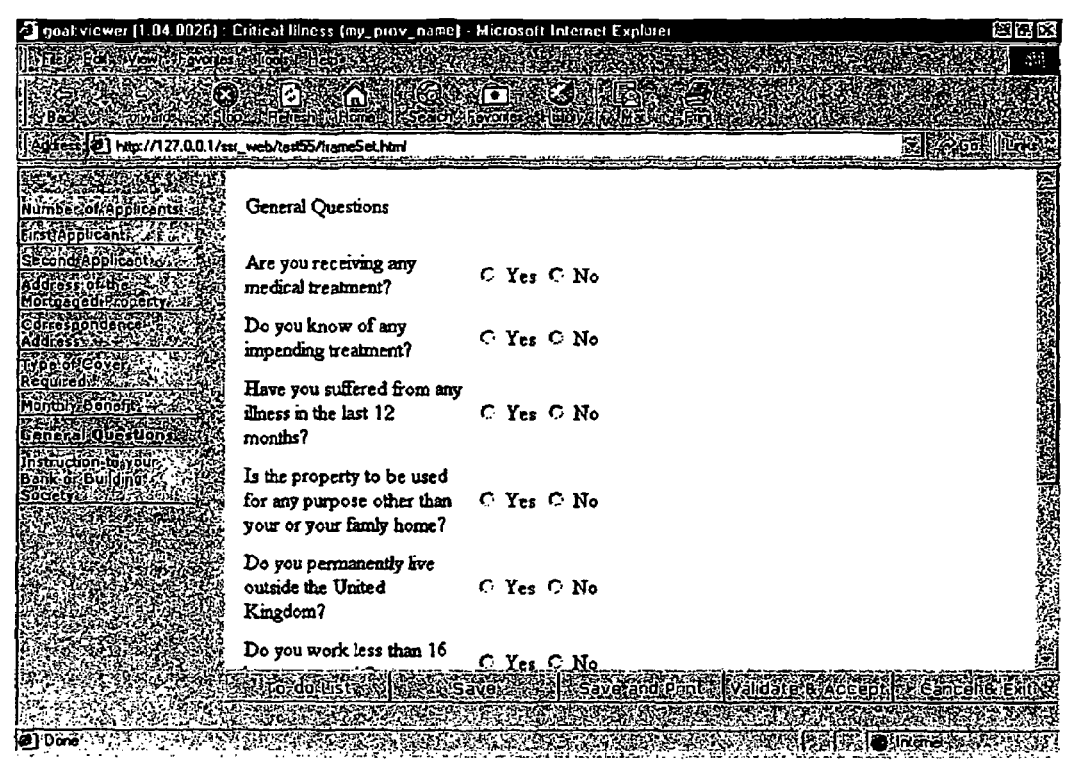
Figure 44:
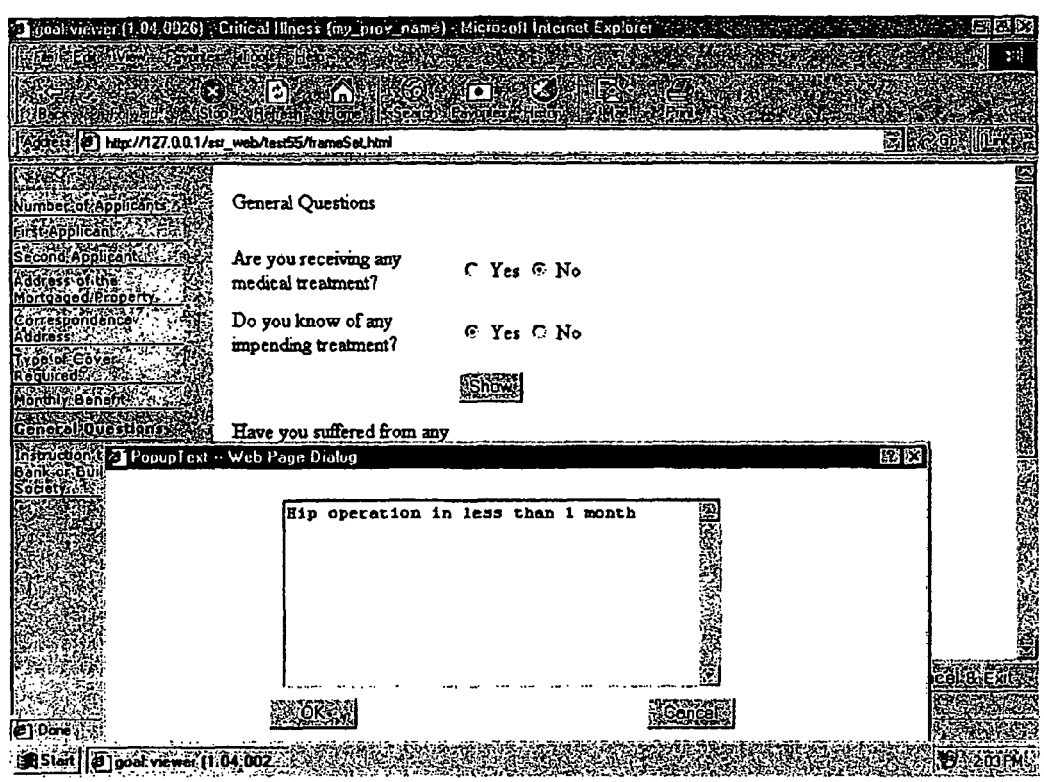
FIG. 44 is a screenshot corresponding to FIG. 42, but presented as an on-line web page.

With reference to FIG. 42, the effects of rule-based actions defined in the data capture definition file is shown in display 420. In this display, the user has selected the "yes" option 422 in response to prompt 421. As a consequence, this event fires a rule-based action to display a new user input button 423 to enable the collection of free text notes regarding the previous response in a new user data entry window 424. FIGS. 43 and 44 illustrate corresponding events in a web-based data capture process.

Upon completion of, or during, the data capture process, the data is verified by the presentation/execution layer 7 according to the data verification specification contained in the data capture definition file 17. Where conflicts with the data validation specification are found, an alert window 450 is displayed to the user. This may take the form of a to-do list of items for correction, together with a diagnosis 451 of the error.

Figure 45:
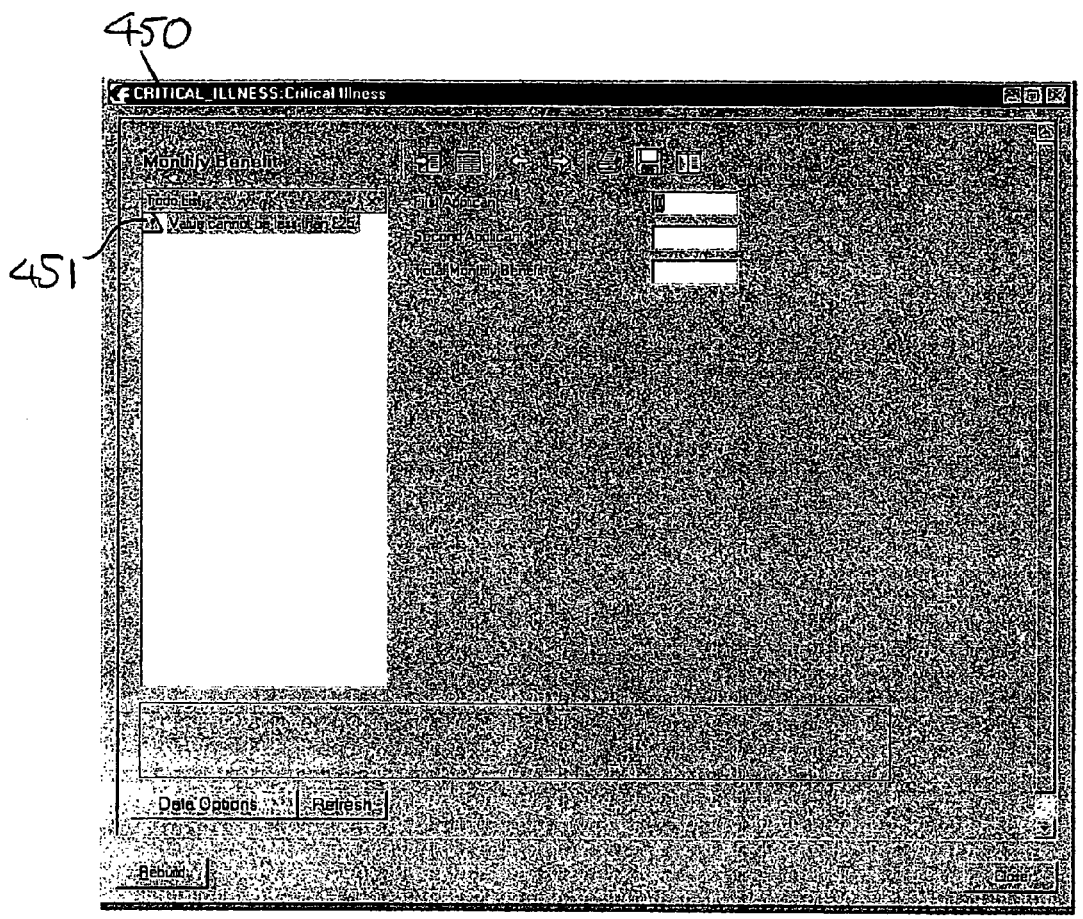
FIG. 45 is a screenshot of an alert box generated during data validation.
Figure 46:
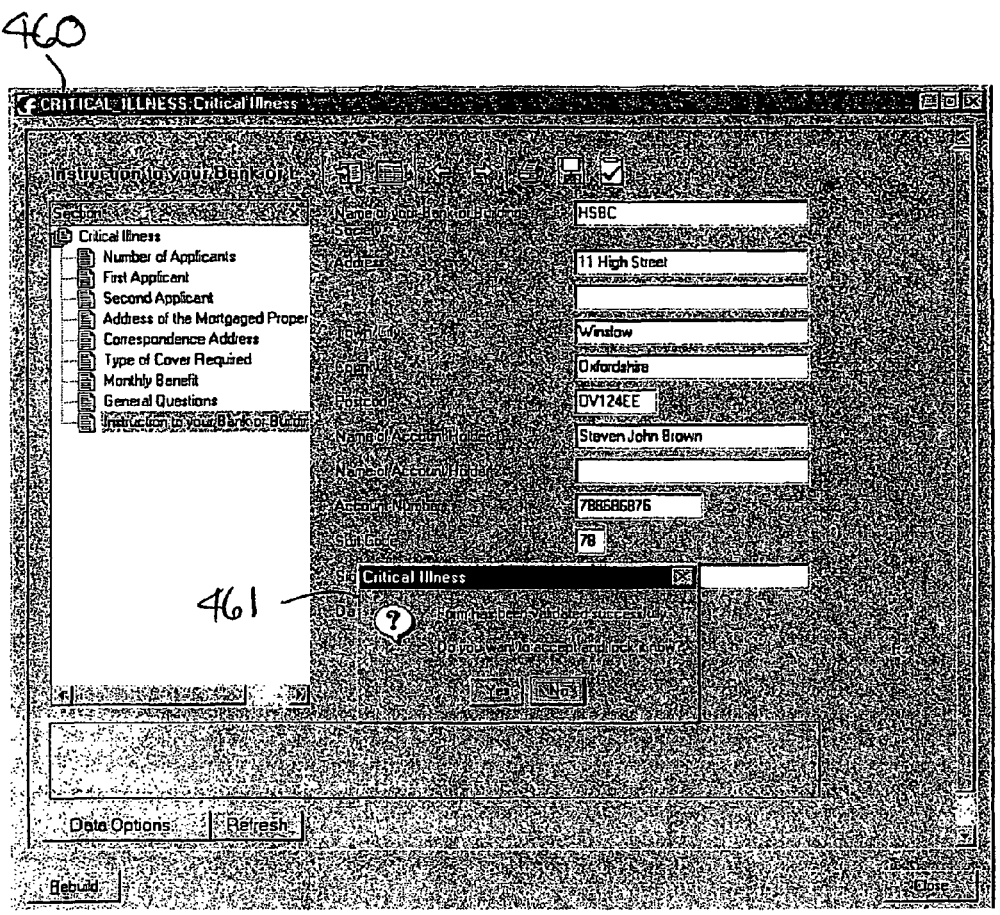
FIG. 46 is a screenshot of a completion control box presented after data entry.
Figure 47:
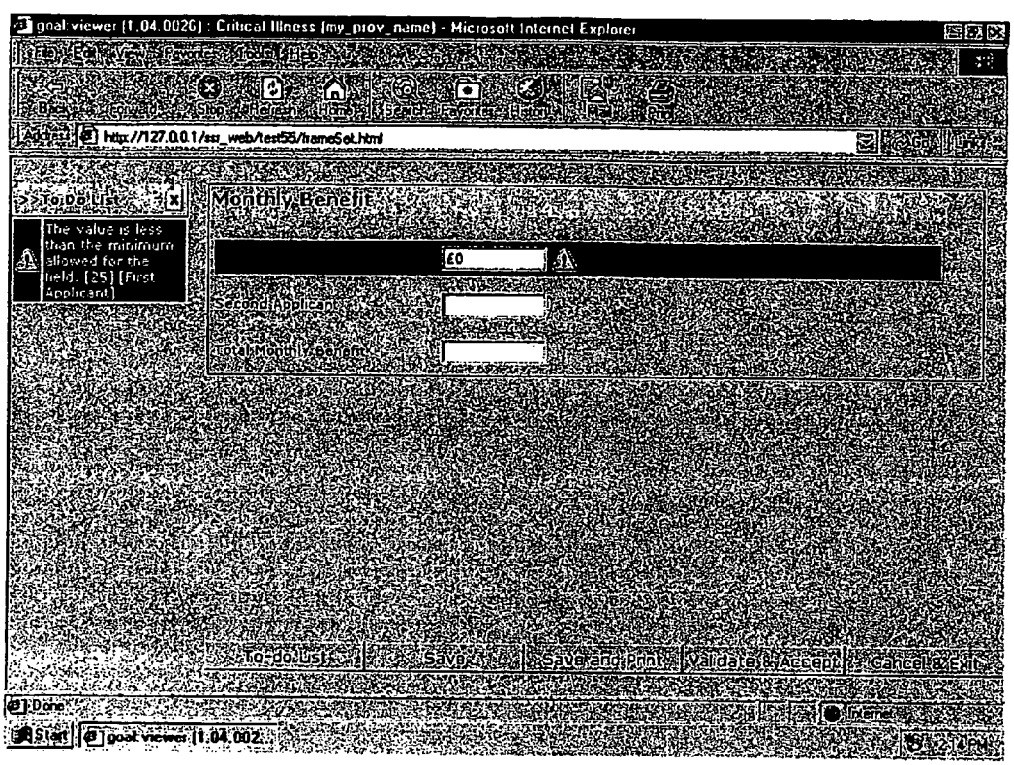
FIG. 47 is a screenshot of an alert box corresponding to that of FIG. 45, but presented as an on-line web page.
Figure 48:
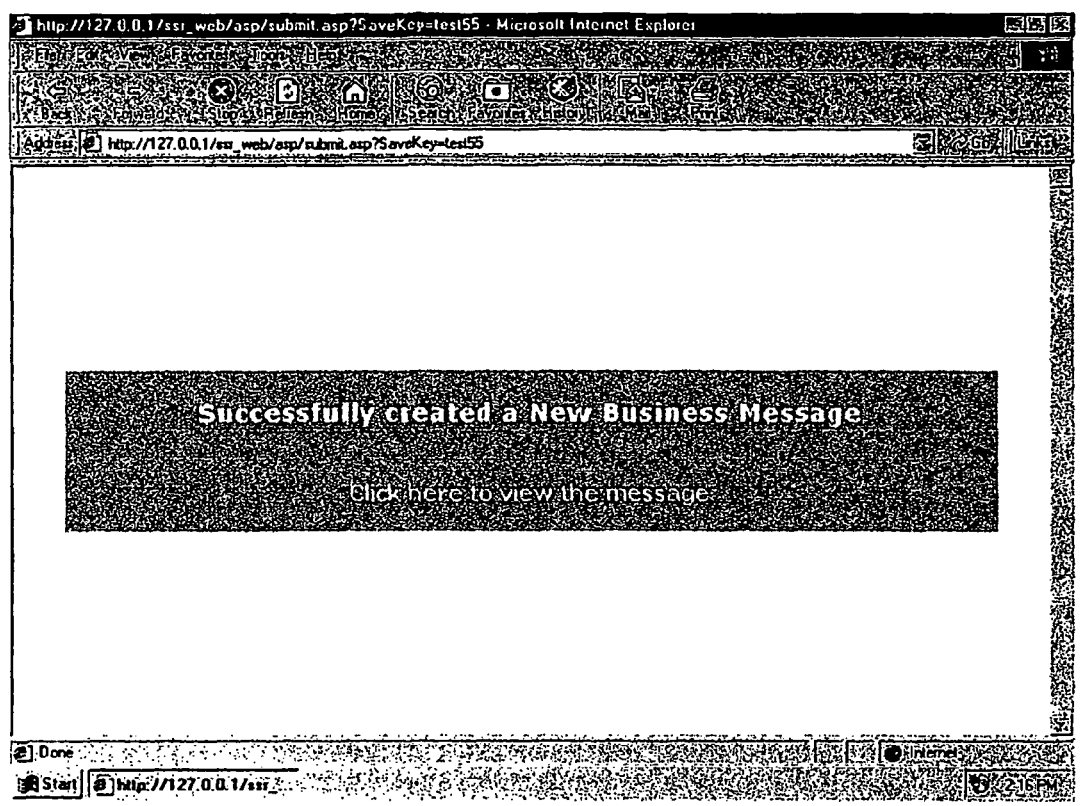
FIG. 48 is a screenshot of a completion control box corresponding to that of FIG. 46, but presented as an on-line web page.

Upon completion of the validation process by the presentation/execution layer 7, a control box 461 in window 460 may offer the data capture user the opportunity to accept and lock the completed form. FIGS. 47 and 48 illustrate corresponding displays to FIGS. 45 and 46 in a web-browser based implementation.

Other embodiments are within the scope of the appended claims.

The invention claimed is:

1. Apparatus for automatically building an electronic form for presentation to a user during a data capture process, comprising:

means for generating a self-contained platform-independent data capture definition file specifying data elements required during data capture, each data element having a type specification and a logical relationship relative to other data elements in a hierarchical structure defined in the data capture definition file, the means for generating the data capture definition file further including means for enabling automatic building of portions of said data capture definition file according to a form definition standard; and means for receiving as input the self contained platform-independent data capture definition file and automatically generating a plurality of visual displays for presentation to a user during execution of a data capture process, each visual display having an automatically determined form layout comprising a plurality of user input areas corresponding to the data elements, in which the form layout and physical positioning of the user input areas on each display are determined, during runtime of the data capture process from information in the data capture definition file, in a manner corresponding to the defined logical hierarchical structure.

2. The apparatus of claim 1 wherein the data capture definition file is in XML format.

3. The apparatus of claim 1 in which the data capture definition file further includes a functional specification of data validation operations to be performed in respect of at least some of said data elements during execution of said data capture process, said means for generating further including means for executing said data validation operations during said data capture process.

4. The apparatus of claim 1 in which the data capture definition file further includes a functional specification of rule-based actions to be taken during execution of the data capture process, said means for generating visual displays further including means for executing said rule-based actions during said data capture process, and determining successive visual displays for presentation to the user during the data capture process according to values of data captured and the rule-based actions applicable thereto.

5. The apparatus of claim 4 wherein the means for generating the data capture definition file further includes means for incorporating said rule-based actions to be performed during execution of the data capture process, by a rule builder interface that enables rule actions and conditions to be assigned to data capture events.

6. The apparatus of claim 1 in which the data capture definition file further includes a functional specification of a data model defining the bindings of data elements with an output message format.

7. The apparatus of claim 1 in which the data capture definition file further includes a functional specification of data exchange requirements according to the form definition standard.

8. The apparatus of claim 1 wherein the means for generating the data capture definition file further includes binding interface means for incorporating binding definitions into said data capture definition file, each binding definition defining the binding of a data element to a defined external data model.

9. The apparatus of claim 1 further including means for ensuring that said specification of data elements complies with the form definition standard.

10. The apparatus of claim 1 further including means for executing a data capture process, comprising:

means for generating a succession of visual displays for presentation to a user, the physical layout of said visual displays being determined, during execution of the data capture process, according to the defined data elements and their hierarchical structure in the data capture definition file, and according to process and display conditions prevailing in the platform executing the data capture process.

11. The apparatus of claim 10 in which the means for executing the data capture process fun her includes means for executing data validation operations according to a functional specification of data validation operations defined in said data capture definition file.

12. The apparatus of claim 10 in which the means for executing the data capture process fun her includes means for executing rule-based actions according to a functional specification of rule-based actions defined in said data capture definition file.

13. The apparatus of claim 10 in which the means for generating a succession of visual displays further comprises:

means for inferring a relative physical positioning of user prompts for data element capture and a sequential progression of user prompts for data element capture from the data capture definition file, and means for determining absolute physical positioning of user prompts and presentation styles thereof according to criteria defined in the means for executing the data capture process, and not the data capture definition file.

14. The apparatus of claim 1 in which the means for generating said data capture definition file and the means for generating visual displays operate on different computing platforms.

15. Apparatus for generating a self-contained platform-independent data capture definition file for defining data elements required from a user during a data capture process, comprising:

means for receiving as input a specification of data elements required during data capture, each data element having a type specification and a logical relationship relative to other data elements in a hierarchical structure, said type specifications and said hierarchical structure being usable for automatically determining a physical layout of visual displays for presentation to a user during a subsequent data capture process;

means for associating, with said data elements, a set of data validation requirements for validating data captured in respect of each of the data elements;

means for associating, with said data elements, a set of rules for execution during a subsequent data capture process, for further enabling automatic determination of a physical layout of the visual displays to be presented to a user during said subsequent data capture process based on values of data captured during said data capture process; and means for generating said self-contained platform-independent data capture definition file defining said specification of data elements, said hierarchical structure, said data validation requirements and said set of rules in a predetermined format for subsequent execution by a data capture process, the means for generating said self-contained platform-independent data capture definition file further including means for enabling automatic building of portions of said data capture definition file according to a form definition standard.

16. The apparatus of claim 15 wherein the data capture definition file conforms to a standard that can be executed on a plurality of different platforms.

17. The apparatus of claim 16 in which the data capture definition file is generated in XML format.

18. The apparatus of claim 15 further including means for incorporating, into said data capture definition file, a functional specification of data exchange requirements according to the form definition standard.

19. The apparatus of claim 15 further including binding interface means for incorporating binding definitions into said data capture definition file, each binding definition defining the binding of a data element to a defined external data model.

20. The apparatus of claim 15 further including means for ensuring that said specification of data elements complies with the form definition standard.

21. The apparatus of claim 15 further including means for assigning, to the data capture definition file, document ownership and execution rights.

22. The apparatus of claim 15 further including means for generating at least a part of the data capture definition file by automatic copying of a global template.

23. The apparatus of claim 22 further including means for correlating changes made in global templates with relevant parts of data capture definition files that have been built using those templates.

24. The apparatus of claim 23 further including means for generating an impact analysis report identifying potential consequences to relevant data capture definition files resulting from a proposed change to a template.

25. The apparatus of claim 15 further including a document validation module for ensuring compliance of a generated data capture definition file with at least one of a form definition standard, a function definition standard and a data model standard.

26. The apparatus of claim 14 in which the means for generating said data capture definition file further includes means for associating each data element with a respective section or sub-section in said logical hierarchical structure.

27. Apparatus for automatically generating an electronic form for presentation to a user during a data capture process, the apparatus comprising:
means for generating a self-contained platform-independent data capture definition file in a predetermined format providing a specification of data elements required during data capture, each data element having a type specification and a logical relationship relative to other data elements in a hierarchical structure defined in the data capture definition file, the means for generating the data capture definition file further including means for enabling automatic building of portions of said data capture definition file according to a form definition standard; and
means for receiving as input the self contained platform-independent data capture definition file and automatically generating a plurality of visual displays for presentation to the user, each visual display having an automatically determined form layout including a plurality of user input areas and user prompts relating thereto corresponding to the data elements, in which the form layout and physical positioning of the user input areas on each display are determined, during runtime of the data capture process from information in the data capture definition file, in a manner corresponding to the defined logical hierarchical structure.

28. A computerized method of automatically building an electronic form for presentation to a user during a data capture process, comprising:
in a first computer process, generating a self-contained platform-independent data capture definition file specifying data elements required during data capture, each data element having a type specification and a logical relationship relative to other data elements in a hierarchical structure defined in the data capture definition file, wherein generating the data capture definition file includes automatic building of portions of said data capture definition file according to a form definition standard; and
in a second computer process, receiving as input the self-contained platform-independent data capture definition file and automatically generating a plurality of visual displays for presentation to a user during execution of a data capture process, each visual display having an automatically determined form layout comprising a plurality of user input areas corresponding to the data elements, in which the form layout and physical positioning of the user input areas on each display are determined, during runtime of the data capture process from information in the data capture definition file, in a manner corresponding to the defined logical hierarchical structure.

29. A computerized method of generating a self-contained platform-independent data capture definition file for defining data elements required from a user during a data capture process, comprising:
in a first computer process, receiving as input a specification of data elements required during data capture, each data element having a type specification and a logical relationship relative to other data elements in a hierarchical structure, said type specifications and said hierarchical structure being usable for automatically determining a physical layout of visual displays for presentation to a user during a subsequent data capture process;
in a second computer process, associating, with said data elements, a set of data validation requirements for validating data captured in respect of each of the data elements;
in a third computer process, associating, with said data elements, a set of rules for execution during a subsequent data capture process, for further enabling automatic determination of a physical layout of the visual displays to be presented to a user during said subsequent data capture process based on values of data captured during said data capture process; and
in a fourth computer process, generating said self contained platform-independent data capture definition file defining said specification of data elements, said hierarchical structure, said data validation requirements and said set of rules in a predetermined format for subsequent execution by a data capture process, wherein generating the data capture definition file includes automatic building of portions of said data capture definition file according to a form definition standard.

30. A computerized method of generating an electronic form for presentation to a user during a data capture process, comprising:
in a first computer process, generating a self contained platform-independent data capture definition file in a predetermined format providing a specification of data elements required during data capture, each data element having a type specification and a logical relationship relative to other data elements in a hierarchical structure defined in the data capture definition file, the means for generating the data capture definition file further including means for enabling automatic building of portions of said data capture definition file according to a form definition standard;

in a second computer process, receiving as input the self-contained platform-independent data capture definition file and automatically generating a plurality of visual displays for presentation to the user, each visual display having an automatically determined form layout including a plurality of user input areas and user prompts relating thereto corresponding to the data elements, in which the form layout and physical positioning of the user input areas on each display are determined, during runtime of the data capture process from information in the data capture definition file, in a manner corresponding to the defined logical hierarchical structure.

31. A computer program product, comprising a tangible computer readable medium having thereon computer program code adapted, when said computer program code is loaded onto a computer, to make the computer execute the procedure of any one of claims 28 to 30.

32. Apparatus for automatically building an electronic form for presentation to a user during a data capture process, comprising:

a data capture definition file generator for generating a self-contained platform-independent data capture definition file specifying data elements required during data capture, each data element having a type specification and a logical relationship relative to other data elements in a hierarchical structure defined in the data capture definition file, the data capture definition file generator enabling automatic building of portions of said data capture definition file according to a form definition standard; and a visual display generator coupled to receive the data capture definition file for automatically generating a plurality of visual displays for presentation to a user during execution of a data capture process, each visual display having an automatically determined form layout comprising a plurality of user input areas corresponding to the data elements, in which the form layout and physical positioning of the user input areas on each display are determined, during runtime of the data capture process from information in the data capture definition file, in a manner corresponding to the defined logical hierarchical structure.

33. Apparatus for generating a self-contained platform-independent data capture definition file for defining data elements required from a user during a data capture process, comprising:

an input for receiving a specification of data elements required during data capture, each data element having a type specification and a logical relationship relative to other data elements in a hierarchical structure, said type specifications and said hierarchical structure being usable for automatically determining a physical layout of visual displays for presentation to a user during a subsequent data capture process;

a data capture definition file generator for associating, with said data elements, a set of data validation requirements for validating data captured in respect of each of the data elements and a set of rules for execution during a subsequent data capture process, for further enabling automatic determination of a physical layout of the visual displays to be presented to a user during said subsequent data capture process based on values of data captured during said data capture process, and generating said self-contained platform-independent data capture definition file defining said specification of data elements, said hierarchical structure, said data validation requirements and said set of rules in a predetermined format for subsequent execution by a data capture process the data capture definition file generator enabling automatic building of portions of said data capture definition file according to a form definition standard.

34. Apparatus for generating an electronic form for presentation to a user during a data capture process, the apparatus comprising:

a data capture definition file generator for generating a self contained platform-independent data capture definition file in a predetermined format providing a specification of data elements required during data capture, each data element having a type specification and a logical relationship relative to other data elements in a hierarchical structure defined in the data capture definition file, the data capture definition file generator enabling automatic building of portions of said data capture definition file according to a form definition standard; and a visual display generator coupled to receive the data capture definition file for automatically generating a plurality of visual displays for presentation to the user, each visual display having an automatically determined form layout including a plurality of user input areas and user prompts relating thereto corresponding to the data elements, in which the form layout and physical positioning of the user input areas on each display are determined, during runtime of the data capture process from information in the data capture definition file, in a manner corresponding to the defined logical hierarchical structure.

* * * * *

UNITED STATES PATENT AND TRADEMARK OFFICE
CERTIFICATE OF CORRECTION

PATENT NO. : 7,600,182 B2  Page 1 of 1
APPLICATION NO. : 10/516898
DATED : October 6, 2009
INVENTOR(S) : Carr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this

Fifth Day of October, 2010

David J. Kappos
*Director of the United States Patent and Trademark Office*